(12) United States Patent
Ashraf et al.

(10) Patent No.: US 11,887,782 B2
(45) Date of Patent: *Jan. 30, 2024

(54) ENERGY STORAGE DEVICE AND SUPERCAPACITOR

(71) Applicant: KING FAHD UNIVERSITY OF PETROLEUM AND MINERALS, Dhahran (SA)

(72) Inventors: Muhammad Ashraf, Dhahran (SA); Muhammad Nawaz Tahir, Dhahran (SA); Nisar Ullah, Dhahran (SA); Syed Shaheen Shah, Dhahran (SA); Ibrahim Khan, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/311,352

(22) Filed: May 3, 2023

(65) Prior Publication Data
US 2023/0274892 A1 Aug. 31, 2023

Related U.S. Application Data

(63) Continuation of application No. 17/586,166, filed on Jan. 27, 2022, now Pat. No. 11,688,564.

(51) Int. Cl.
*H01G 11/46* (2013.01)
*H01G 11/36* (2013.01)
(Continued)

(52) U.S. Cl.
CPC ............. *H01G 11/46* (2013.01); *H01G 11/24* (2013.01); *H01G 11/26* (2013.01); *H01G 11/36* (2013.01); *H01G 11/52* (2013.01)

(58) Field of Classification Search
None
See application file for complete search history.

(56) References Cited

U.S. PATENT DOCUMENTS 10,483,595 B2   11/2019   Zhang
11,688,564 B1 *  6/2023   Ashraf .................. H01G 11/24
                                                          361/502

(Continued)

FOREIGN PATENT DOCUMENTS

| CN | 106449166 B | 4/2018 |
| WO | WO 2018/000938 A1 | 1/2018 |
| WO | WO 2020/237296 A1 | 12/2020 |

OTHER PUBLICATIONS

Hui Peng, et al., "High-performance aqueous asymmetric supercapacitor based on carbon nanofibers network and tungsten trioxide nanorod bundles electrodes", Electrochimica Acta, vol. 147, 2014, pp. 54-61.

(Continued)

*Primary Examiner* — Eric W Thomas
(74) *Attorney, Agent, or Firm* — Oblon, McClelland, Maier & Neustadt, L.L.P.

(57) ABSTRACT

An asymmetric nanocomposite supercapacitor and a method of making the asymmetric nanocomposite supercapacitor. The asymmetric nanocomposite supercapacitor includes a negative electrode with monoclinic tungsten oxide (m-$WO_3$) nanoplates, and a binding compound coated on one face of a substrate, and a positive electrode with a carbonaceous material and a binding compound coated on one face of a substrate. Where the face of the positive electrode and the face of the negative electrode coated with the carbonaceous material and m-$WO_3$ nanoplates, respectively, are separated by and in direct contact with a porous separator.

15 Claims, 25 Drawing Sheets

(51) Int. Cl.
  *H01G 11/24*   (2013.01)
  *H01G 11/26*   (2013.01)
  *H01G 11/52*   (2013.01)

(56) References Cited

U.S. PATENT DOCUMENTS

2009/0303660 A1   12/2009   Nair et al.
2017/0256797 A1   9/2017    Sasaki
2018/0166223 A1   6/2018    Jung

OTHER PUBLICATIONS

Xinhai Yuan, et al., "An Aqueous Asymmetric Supercapacitor Based on Activated Carbon and Tungsten Trioxide Nanowire Electrodes", Chinese Journal of Chemistry, vol. 35, No. 1, Aug 2016, 4 pages (Abstract only).

Kanjun Sun, et al., "An asymmetric supercapacitor based on controllable $WO_3$ nanorod bundle and alfalfa-derived porous carbon", RSC Advances, vol. 11, Issue 59, 2021, pp. 37631-37642.

Muhammad Ashraf, et al., "A High-Performance Asymmetric Supercapacitor Based on Tungsten Oxide Nanoplates and Highly Reduced Graphene Oxide Electrodes", Chemistry—A European Journal, vol. 27, 2021, pp. 6973-6984.

Christelle Wong Pau Ping, "Synthesis of Reduced Graphene Oxide/Tungsten Trioxide Nanocomposite Electrode for High Electrochemical Performance", Dissertation, Institute of Graduate Studies, University of Malaya Kuala Lumpur, 2017, pp. 1-105.

Shepard, "Solar Supercapacitor could Power Future Wearable Sensors", 2018, article (Year: 2018).

\* cited by examiner

ENERGY STORAGE DEVICE AND SUPERCAPACITOR

CROSS-REFERENCE TO RELATED APPLICATIONS

The present application is a Continuation of U.S. application Ser. No. 17/586,166, now allowed, having a filing date of Jan. 27, 2022.

STATEMENT OF PRIOR DISCLOSURE BY THE INVENTOR

Aspects of the present disclosure are described in Ashraf, et.al., "A High-Performance Asymmetric Supercapacitor Based on Tungsten Oxide Nanoplates and Highly Reduced Graphene Oxide Electrodes", 20 Feb. 2021; Chem. Eur. J.; 27; 6973. incorporated herein by reference in its entirety.

BACKGROUND OF THE INVENTION

Field of the Invention

The present disclosure is directed to a supercapacitor, and particularly to an asymmetric nanocomposite supercapacitor, and a process for preparing the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Supercapacitors are potential electrochemical energy storage devices that hold much promise because of their high-power density, long-term cycling stability, high-power attainment, low maintenance costs, and high stability. Tungsten oxides ($WO_{3-x}$) have been tested for energy storage devices because of their stability, availability, and economic viability. $WO_3$ is very promising because of its high theoretical capacity, good chemical stability, and high conductivity. It is an n-type semiconductor with variable oxidation states, high energy and packing density, and large pseudo-capacitance. It has been used not only in secondary batteries, photocatalysis, gas sensing, or electrochemical, and solar energy devices, but also as an electrode material for flexible and portable supercapacitors. Much consideration has been devoted to its pseudocapacitor performance, however it is worth mentioning that nano-dimensions and morphology of the $WO_3$ plays important role in its energy storage applications.

Accordingly, it is one object of the present disclosure to provide the shape-controlled synthesis of monoclinic tungsten oxide (m-$WO_3$) nanosheets using a hydrothermal method. It is another object of the present disclosure, to use the m-$WO_3$ as an electrode material to fabricate an asymmetric nanocomposite supercapacitor (ASC).

SUMMARY

The present disclosure presents an asymmetric nanocomposite supercapacitor, including a first electrode, a second electrode, and a porous separator, which has been coated with an electrolyte. The first electrode comprises a first substrate at least partially coated on one face with a first mixture of a first binding compound and a carbonaceous material. The second electrode comprises a second substrate at least partially coated on one face with a second mixture of a second binding compound and monoclinic tungsten-oxide (m-$WO_3$) nanoplates. Such that the face of the first substrate and the face of the second substrate coated with the carbonaceous material and m-$WO_3$ nanoplates, respectively, are separated by and in direct contact with the porous separator.

In an embodiment, the porous separator is at least one selected from a group consisting of polypropylene membrane, glass fiber, and cellulose fiber. The electrolyte is at least one selected from a group consisting of hydrogen halides, sulfuric acid, nitric acid, perchloric acid, chloric acid, alkali metal salts, and alkaline earth metal salts. The binding compound is at least one selected from a group consisting of polyvinylidene fluoride and n-methylpyrrolidone. The carbonaceous material is at least one selected from the group consisting of graphite, graphene, activated carbon, reduced graphene oxide, highly reduced graphene oxide (HRG), carbon nanotubes, carbon nanofibers, and carbon black. The substrate is a formed from at least one material selected from the group consisting of copper, aluminum, nickel, iron, and steel.

In an embodiment, the first mixture comprises 10-20 wt % of the first binding compound and 80-90 wt % of the carbonaceous material based on the total weight of the first binding compound, and the carbonaceous material, and the second mixture comprises 10-20 wt % of the second binding compound and 80-90 wt % of the m-$WO_3$ nanoplates based on the total weight of the binding compound, and the m-$WO_3$ nanoplates.

In an embodiment, the carbonaceous material is HRG, the HRG is substantially crystalline and in layered sheet form having 2-20 layers, the sheets have an average d-spacing of 0.25-0.45 nm, and the HRG comprises at most 5% oxygen based on the total atomic weights of carbon, hydrogen, and oxygen in the HRG.

In an embodiment, the m-$WO_3$ nanoplates are substantially monoclinic crystalline phase, the platelets have an average length of 50-200 nm, an average width of 10-150 nm, and an average thickness of 5-20 nm, and the O and W elements are homogeneously distributed throughout the nanoplates.

In an embodiment, the carbonaceous material is HRG, the HRG has a surface area of 500-800 $m^2/g$, and the m-$WO_3$ nanoplates have a surface area of 150-250 $m^2/g$.

In an embodiment, the thickness of the coating of the carbonaceous material on the first substrate and the m-$WO_3$ nanoplates on the second substrate is less than 500 nm each.

In an embodiment, the first electrode has a specific capacitance of at least 440 F/g at a current density of 0.5 A/g.

In an embodiment, the second electrode has a specific capacitance of at least 310 F/g at a current density of 0.5 A/g.

In an embodiment, asymmetric nanocomposite supercapacitor where the carbonaceous material is HRG, has a specific capacitance of at least 380 F/g at a current density of 0.5 A/g.

In an embodiment, at least 90% of the initial specific capacitance of the asymmetric nanocomposite supercapacitor is maintained after 5000 charge-discharge cycles.

In an embodiment, the asymmetric nanocomposite supercapacitor has an energy density of at least 90 Wh/kg at a power density of 500 W/kg.

In an embodiment, asymmetric nanocomposite supercapacitor is operated up to 1.8 V.

In an embodiment, the second electrode comprising the m-WO$_3$ nanoplates is an anode in a lithium-ion battery.

In an embodiment, the asymmetric nanocomposite supercapacitor is electrically connected to a sensor, and functions as a battery in a wearable device.

In an embodiment, 2-10 of the asymmetric nanocomposite supercapacitors connected in parallel and/or series.

The present disclosure also provides a method of making the asymmetric nanocomposite supercapacitor. The method includes mixing 80-90 wt % of the carbonaceous material with 10-20 wt % of the first binding compound based on the total weight of the carbonaceous material and the first binding compound in a polar aprotic solvent and stirring for at least 3 hours to form a carbonaceous slurry. Also, mixing 80-90 wt % of the m-WO$_3$ nanoplates with 10-20 wt % of the second binding compound based on the total weight of the m-WO$_3$ nanoplates and the second binding compound in a polar aprotic solvent and stirring for at least 3 hours to form a m-WO$_3$ nanoplates slurry. The method also includes, coating a layer of the carbonaceous slurry onto the first substrate to form a carbonaceous electrode, and coating a layer of the m-WO$_3$ nanoplates slurry onto the second substrate to form a m-WO$_3$ nanoplates electrode. The method further includes, drying the carbonaceous electrode and the m-WO$_3$ nanoplates electrode in an oven at a temperature of at least 60° C. for at least 4 hours to form a dried carbonaceous electrode and a dried m-WO$_3$ nanoplates electrode, respectively. Also the method includes, soaking the porous separator in an aqueous solution of the electrolyte for at least 1 hour to form an electrolyte porous separator. The method includes combining the dried carbonaceous electrode, the dried m-WO$_3$ nanoplates electrode, and the electrolyte porous separator, such that the first and second substrates are outer layers and the carbonaceous and m-WO$_3$ nanoplates are inner layers separated by the electrolyte porous separator to make an asymmetric nanocomposite supercapacitor.

The present disclosure also provides a method of making the m-WO$_3$ nanoplates. The method includes dissolving a tungsten oxide salt in acid and stirring for at least 1 hour to form a tungsten oxide solution. The method also includes, mixing ammonium nitrate into the tungsten oxide solution and heating to at least 160° C. for at least 12 hours in an autoclave to form a reaction mixture, and then cooling to at least 30° C., and filtering the reaction mixture to leave a precipitate. The method further includes, washing with a polar solvent and drying the precipitate at a temperature of at least 60° C. for at least 3 hours to leave m-WO$_3$ nanoplates.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
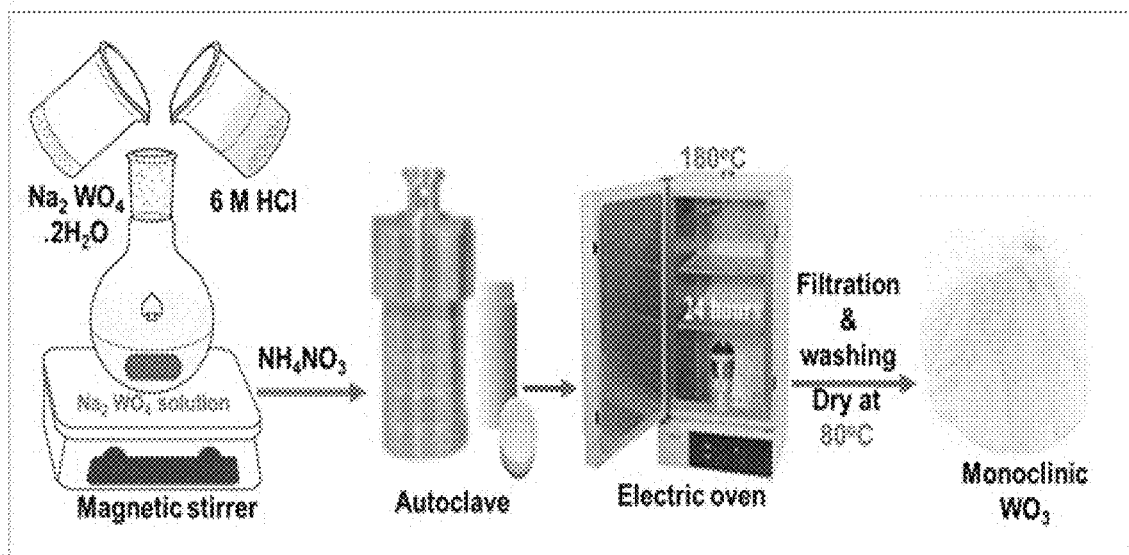
FIG. 1 is a schematic illustration of the synthesis of m-WO$_3$ nanoplates.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, "substrate" refers to a substrate including a conducting material, which may be, but is not in any manner limited to, metals, metal alloys, and other conducting materials.

As used herein, "electrolyte" refers to substances that conduct electric current because of dissociation of the electrolyte into positively and negatively charged ions.

As used herein, "positive electrode", or "cathode" refers to an electrode from which a conventional current leaves a polarized electrical device and in this disclosure comprises a carbonaceous material.

As used herein, "negative electrode", or "anode" is an electrode through which the conventional current enters into a polarized electrical device and in this disclosure comprises m-$WO_3$ nanoplates.

As used herein, "active material" refers to the carbonaceous material in the positive electrode and the m-$WO_3$ nanoplates in the negative electrode.

As used herein, "binding compound" or "binding agent" or "binder" refers to compounds or substances which hold or draw other materials together to form a cohesive whole mechanically and/or chemically, by adhesion or cohesion.

As used herein, "aprotic solvent" refers any solvent that does not contain a labile $H^+$ ion.

As used herein, a "voltammogram" is a graph that can be drawn after an electrochemical experiment. This graph has a typical, recognizable form in which the electron flow (current: I) is measured in Volts against the potential (E).

As used herein, "amount" refers to the level or concentration of one or more reactants, catalysts, present in a reaction mixture.

The use of the singular herein includes the plural (and vice versa) unless specifically stated otherwise.

The use of the terms "include," "includes", "including," "have," "has," or "having," "comprise," "comprises," "comprising" or the like should be generally understood as open-ended and non-limiting unless specifically stated otherwise.

It is understood that the order of steps or order for performing certain actions can be changed so long as the intended result is obtained. Moreover, two or more steps or actions may be conducted simultaneously.

Embodiments of the present disclosure are directed to an asymmetric nanocomposite supercapacitor (ASC) in which monoclinic tungsten oxide (m-$WO_3$) nanoplates are the active material in the negative electrode and a carbonaceous material is the active material in the positive electrode. The supercapacitor and the electrodes thereof are described according to physical and electrochemical performance. As described herein in certain embodiments, the supercapacitor demonstrates high specific capacitance across a wide operation potential, opening potential application in a variety of energy storage devices.

Figure 4:
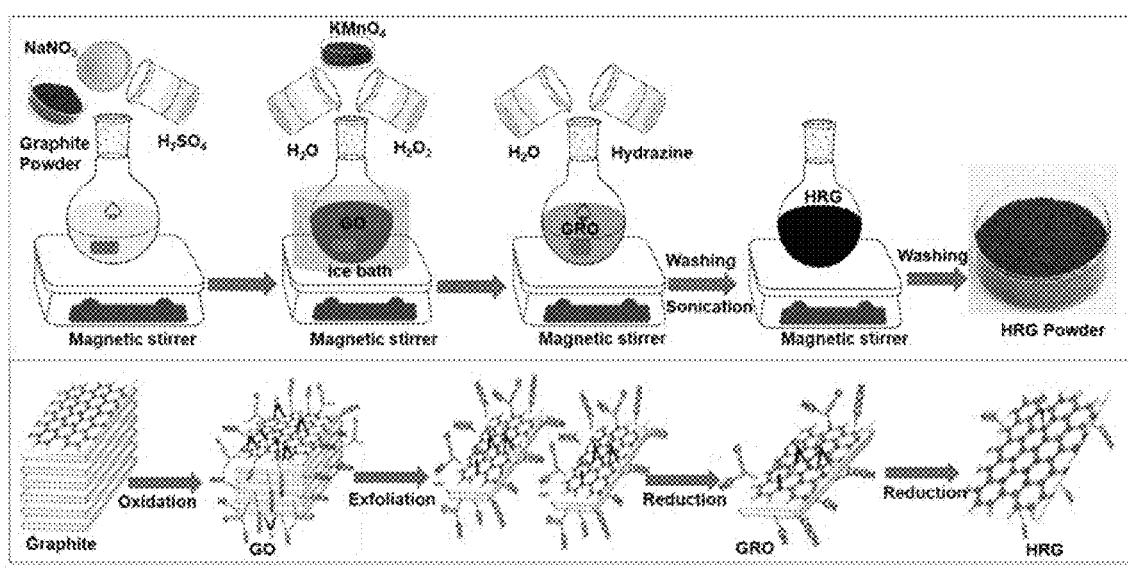
FIG. 4 is a synthetic scheme for the oxidation of graphite powder and further reduction of GO into GRO and HRG.

In some embodiments, the carbonaceous material is HRG. HRG is synthesized as shown in FIG. 4 by a modified Hummers method See William, S.; Hummers, J.; Offeman, R. E., Preparation of graphitic oxide. *J. Am. Chem. Soc* 1958, 80 (6), 1339-1339, incorporated herein by reference in its entirety. The order in which the method is described is not intended to be construed as a limitation, and any number of the described method steps can be combined in any order to implement the method. Additionally, individual steps may be removed or skipped from the method without departing from the spirit and scope of the present disclosure. This method is a cheap and simple way to produce reduced graphene sheets from graphite, in contrast to purchasing expensive graphene. In some embodiments, the method includes exfoliating and reducing graphite multiple times to leave smaller stacks of graphene sheets.

Figure 5A:
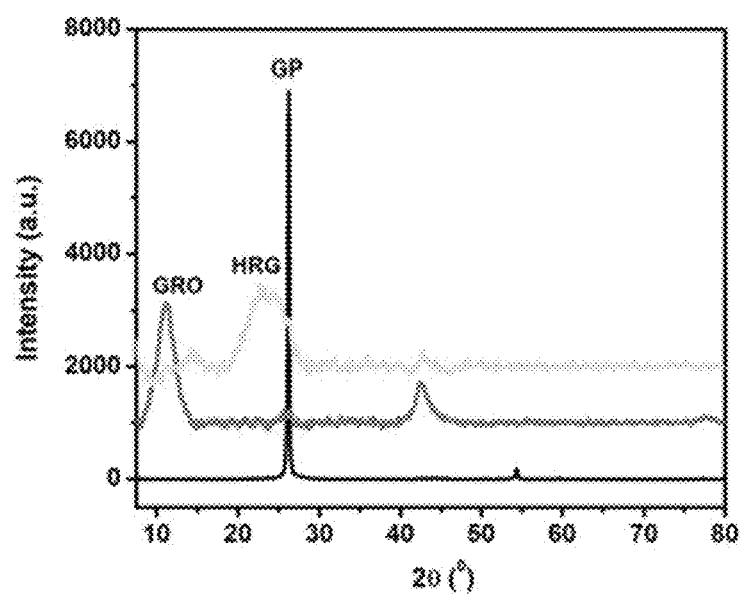
FIGS. 5*a*-5*b* are graphs illustrating the (a) XRD diffractograms of GP, GRO & HRG and (b) the Raman spectra of GP, GRO, & HRG.
Figure 6A:
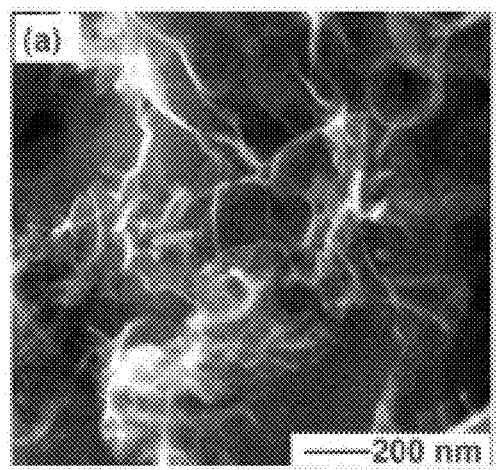
FIGS. 6*a*-6*b* illustrate (a) FESEM and (b) TEM images of the as prepared HRG sheets like structure.
Figure 6B:
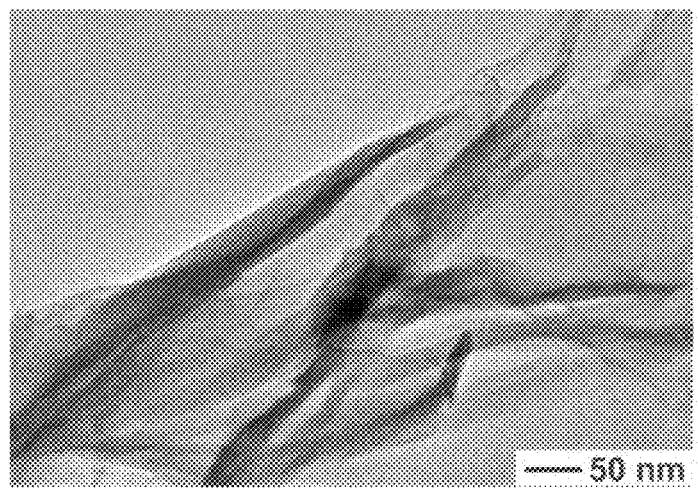

In some embodiments, the HRG is substantially crystalline and in layered sheet form as shown in the XRD spectra, FIG. 5a. In an embodiment, the HRG (002) diffraction peak is at 25.0-30.0°, preferably 25.5-28.0°, or 26.0-27.0°. In some embodiments, the (002) diffraction peak indicates the sheets have an average d-spacing of 0.25-0.45 nm, preferably 0.3-0.4 nm. The d-spacing below 0.5 nm results from a lack of oxygen containing groups on the surface of the sheets, allowing the sheets to pack closer together. In some embodiments, the oxygen containing groups are, for example, water, hydroxyl, and carboxyl. In an embodiment, the HRG comprises 0-5%, preferably 0-3%, or no oxygen, based on the total atomic weights of carbon, hydrogen, and oxygen in the HRG. In an embodiment, the HRG has a surface area of 500-800 $m^2$/g, preferably 600-750 $m^2$/g, or 650-700 $m^2$/g. In some embodiment, the HRG having 2-20 layered sheets, preferably 3-10, or 4-5 sheets (FIG. 6).

A method of making the m-$WO_3$ nanoplates is disclosed, as depicted in FIG. 1. The order in which the method is described is not intended to be construed as a limitation, and any number of the described method steps can be combined in any order to implement the method. Additionally, individual steps may be removed or skipped from the method without departing from the spirit and scope of the present disclosure.

In an embodiment, the m-$WO_3$ nanoplates are made by dissolving a tungsten oxide salt in acid and stirring for at least 30 minutes, preferably 1 hour or 2 hours, to form a tungsten oxide solution. In an embodiment, the tungsten oxide salt may be, but is not limited to sodium tungstate, lithium, tungstate, cesium tungstate, and hydrates thereof. In one embodiment, the tungsten oxide salt is sodium tungstate dihydrate. In an embodiment, the acid is at least one selected from a group consisting of a hydrogen halide, sulfuric acid, nitric acid, perchloric acid, chloric acid, an alkali metal salt, an alkaline earth salt. In one embodiment, the acid is hydrochloric acid.

In an embodiment, the method includes mixing ammonium nitrate into the tungsten oxide solution and heating to at least 160° C., preferably 160-200° C., or 180-190° C. for at least 12 hours, preferably 12-36 hours, or 20-30 hours in an autoclave to form a reaction mixture. In an embodiment, the molar ratio of ammonium nitrate to tungsten oxide salt is 1:5, preferably 1:4, or 1:3.3. In an embodiment, the method includes cooling the reaction mixture to below 30° C., preferably 26-20° C. or 23-24° C. and filtering the reaction mixture to leave a precipitate. In an embodiment, the method includes washing with at least one polar solvent and drying the precipitate at a temperature of at least 60° C., preferably 60-100° C., or 80-90° C. for at least 3 hours, preferably 3-8 hours, or 5-6 hours, to leave m-$WO_3$ nanoplates. In an embodiment, the polar solvent is at least one, but not limited to, water, methanol, ethanol, acetic acid, butanol, and isopropanol.

Figure 2A:
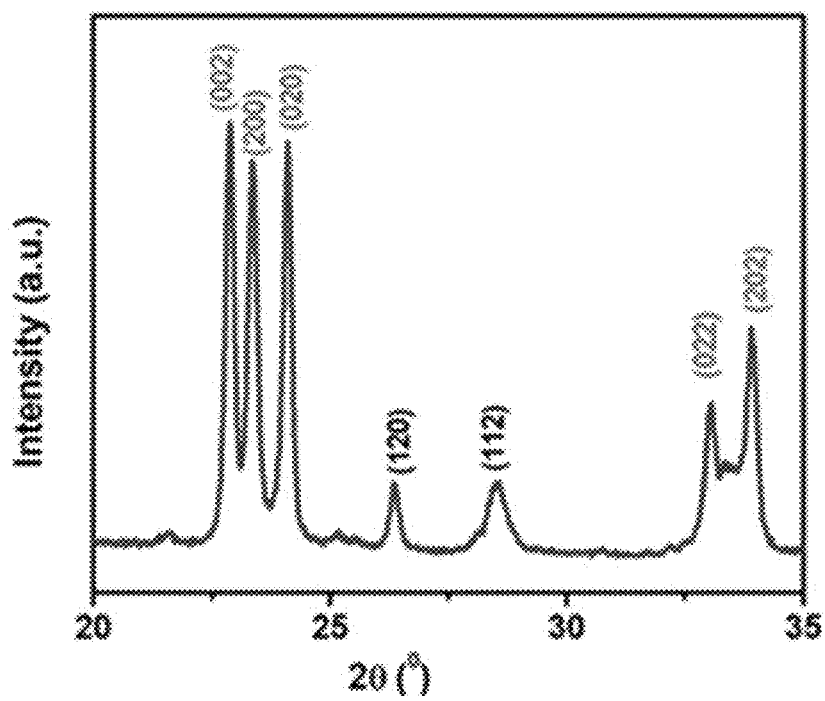
FIGS. 2*a*-2*b* are graphs illustrating the (a) XRD patterns for the m-WO$_3$ nanoplates and (b) the Raman spectrum of the as-prepared m-WO$_3$ nanoplates.
Figures 3A, 3B, 3C, 3D:
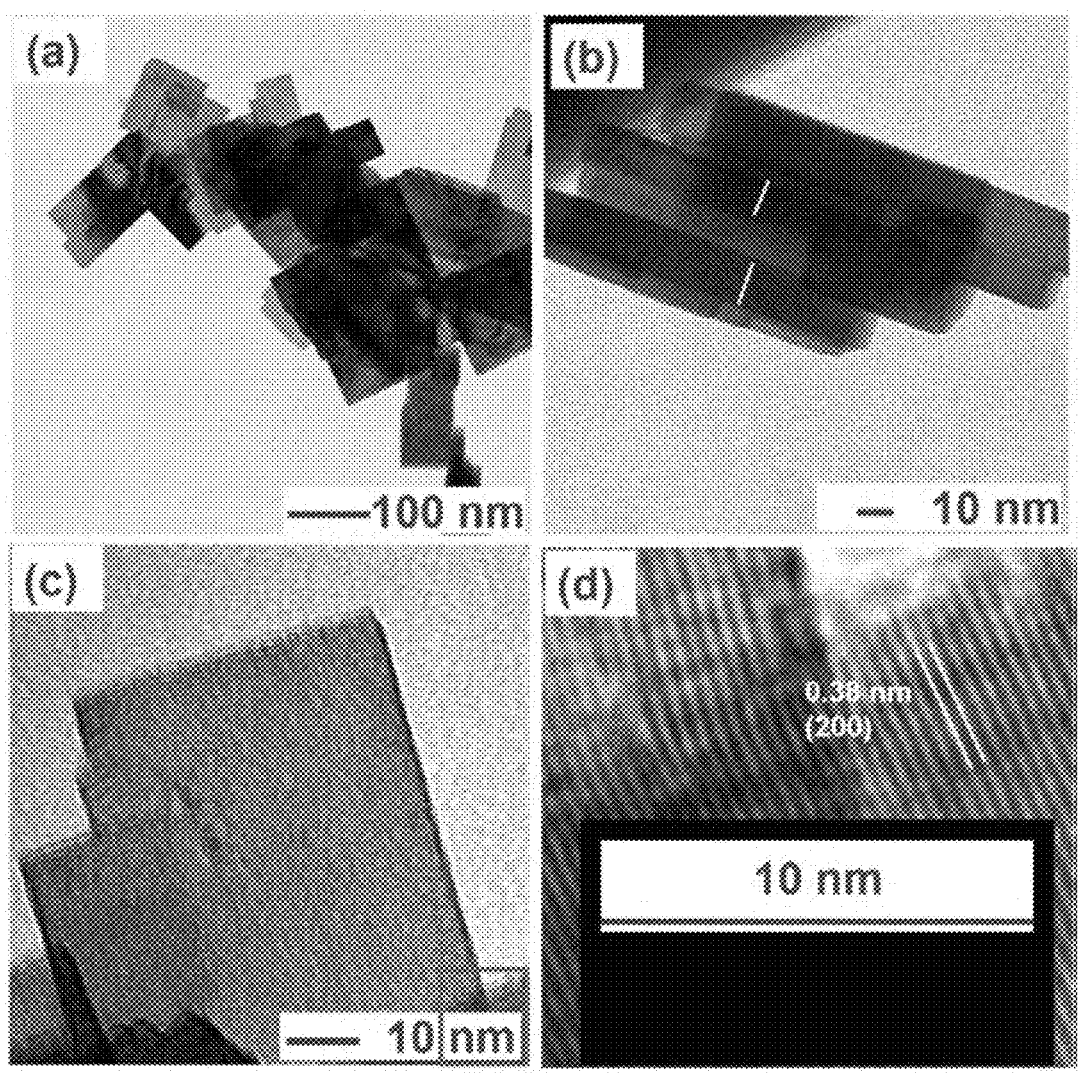
FIGS. 3*a*-3*d* are transmission electron microscopy (TEM) images of as synthesized WO$_3$ nanoplates; (a) overview TEM image, (b) some of the image lying on the lateral axis which also shows the thickness of the nanoplates, and (c & d) corresponding HRTEM images confirming the d-spacing of 0.38 nm related to the (200) crystal plane of m-WO$_3$.

In an embodiment, the m-$WO_3$ nanoplates are substantially monoclinic crystalline phase (FIG. 2a). In an embodiment, the m-$WO_3$ nanoplates are 80% monoclinic crystalline phase, preferably at least 90%, or entirely monoclinic crystalline, and 20% hexagonal, preferably 10% hexagonal, or there is no trace of the hexagonal crystalline phase. In an embodiment, the monoclinic (002) diffraction peak is 20.0-25.0°, preferably 22.5-24.0°, or 23.0-23.5°, the (200) diffraction peak is 21.0-25.0°, preferably 22.5-24.5°, or 23.0-24.0°, the (020) diffraction peak is 21.0-25.0°, preferably 22.5-24.5°, or 23.5-24.5°, the (120) diffraction peak is 25.0-27.5°, preferably 25.5-27.0°, or 26.0-26.5°, the (112) diffraction peak is 27.0-30°, preferably 27.5-29.0°, or 28.0-28.5°, the (022) diffraction peak is 32.0-35.0°, preferably 32.5-34.0°, or 33.0-33.5°, the (202) diffraction peak is 32.0-35.0°, preferably 33.0-34.5°, or 33.5-34.0°. In an embodiment, as the concentration of ammonium nitrate increases, the intensities of the (022) and (202) reflections increase and the intensities of the (120) and (112) reflections decrease, which indicates a plate-like growth of m-$WO_3$. In an embodiment, the platelets have an average length of 50-200 nm, preferably 75-150 nm, or 100-125 nm, an average width of 10-150 nm, preferably 20-120 nm, or 50-100, and an average thickness of 5-20 nm, preferably 8-15 nm, or 11-13 nm (FIG. 3). In an embodiment, the O and W elements are homogeneously distributed throughout the nanoplates. In an embodiment, the platelets have an average d-spacing of 0.3-0.5 nm, preferably 0.32-0.45 nm, or 0.36-0.40 nm. In an embodiment, the m-$WO_3$ nanoplates have a surface area of 150-250 $m^2/g$, preferably 175-225 $m^2/g$, or 200-220 $m^2/g$. The nanoplate structure may improve the overall performance of the negative electrode and thereby the supercapacitor. The plate structure allows the formation of structured channels with a high surface area, thereby improving charge transport through the material. Therefore, to obtain substantially m-$WO_3$ plates the concentration of ammonium nitrate concentration is important.

Figure 11:
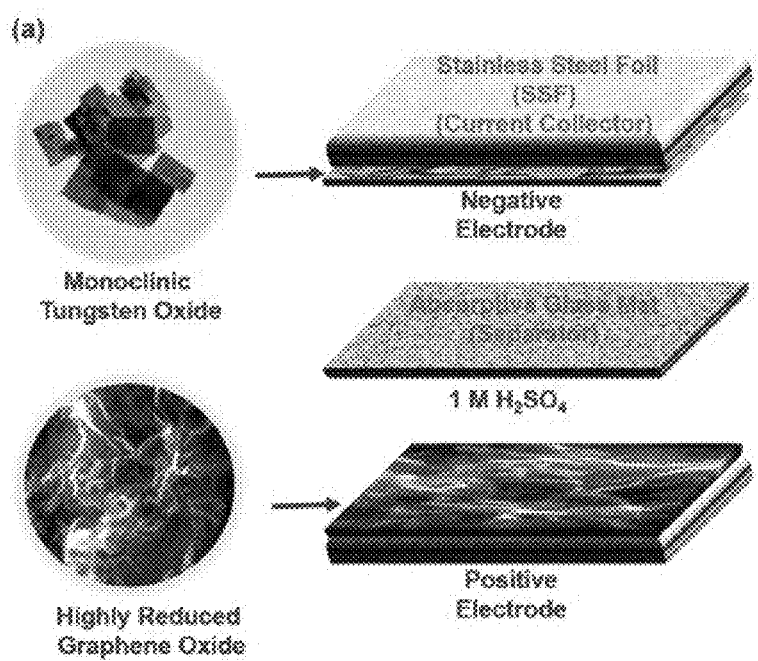
FIG. 11 is an illustration of fabricating asymmetric supercapacitor with highly reduced graphene oxide (HRG) as a positive electrode and m-WO$_3$ as a negative electrode.

FIG. 11 illustrates an embodiment of the ASC. The order and components in which the structure is described is not intended to be construed as a limitation, and any number of the described components can be combined or changed in any order to form the ASC. Additionally, individual components may be removed or skipped without departing from the spirit and scope of the present disclosure.

FIG. 11 presents an ASC including a first current collector, a negative electrode, a separator, a positive electrode, and a second current collector. The first and second current collectors, also referred to as the substrates throughout the current disclosure, are a surface onto which the active materials of the electrodes are coated and is formed from a material such as, but not limited to, copper, aluminum, nickel, iron, stainless steel, and combinations thereof. In one embodiment, the first and second substrate may be stainless steel foil. The first and second substrate are not required to be made of the same material. In one embodiment, the first substrate is stainless steel foil, and the second substrate is aluminum foil. In some embodiments, the substrate can have a length of 1-6 cm, preferably 2-5 cm, or 3-4 cm, a width of 1-6 cm, preferably 2-5 cm, or 3-4 cm, and a thickness of less than 0.05 mm preferably 0.01-0.05 mm, or 0.025-0.035 mm. The negative electrode material is m-$WO_3$ nanoplates, and the positive electrode material is a carbonaceous material. In some embodiments, the carbonaceous material is at least one selected from the group consisting of graphite, graphene, activated carbon, reduced graphene oxide, highly reduced graphene oxide (HRG), carbon nanotubes, carbon nanofibers, and carbon black. In one embodiment, the carbonaceous material is HRG. The separator, also referred to as the porous separator throughout the current disclosure, creates a boundary between the positive and negative electrode. The porous separator is at least one selected from a group consisting of polypropylene membrane, fiberglass, and cellulose fiber. In one embodiment, the separator is fiberglass. In some embodiments, the separator can have a length of 1-6 cm, preferably 2-5 cm, or 3-4 cm, a width of 1-6 cm, preferably 2-5 cm, or 3-4 cm, a thickness of less than 2 mm preferably 0.5-2 mm, or 1-1.5 mm, and a pore size of less than 20 µm, preferably 5-20 µm, or 10-15 µm.

In some embodiments, the porous separator has an electrolyte within its pores. In some embodiments, the electrolyte is selected from a group consisting of hydrogen halides, sulfuric acid, nitric acid, perchloric acid, chloric acid, alkali metal salts, alkaline earth salts and combinations thereof. In some embodiments, the electrolyte is dissolved in water. In one embodiment, the electrolyte is 1 molar (M) sulfuric acid ($H_2SO_4$).

In some embodiments, the active material of the electrodes is mixed with a binding material before it is coated onto a substrate. The binding compound allows for improved adhesion between the active material and the substrate. In an embodiment, a mixture of binding compound and active material has 10-20 wt %, preferably 11-18 wt %, or 12-15 wt % of the binding compound and 80-90 wt %, preferably 82-89 wt % or 85-88 wt % of active material based on the total weight of the binding compound, and active material. The negative and positive electrodes do not need to have the same weight ratio mixtures of binding compound to active material. In an embodiment, the positive electrode is 15 wt % binding compound and 85 wt % carbonaceous material, and the negative electrode is 10 wt % binding compound and 90 wt % m-$WO_3$ nanoplates. In one embodiment, the positive electrode is 10 wt % binding compound and 90 wt % carbonaceous material, and the negative electrode is 10 wt % binding compound and 90 wt % m-$WO_3$ nanoplates.

In one embodiment, the binding compound is one or more selected from a group consisting of polyvinylidene fluoride (PVDF)-based polymers, and its co- and terpolymers with hexafluoro ethylene, tetrafluoroethylene, chlorotrifluoroethylene, polyvinyl fluoride), polytetrafluoroethylene (PTFE), ethylene-tetrafluoroethylene copolymers (ETFE), polybutadiene, cyanoethyl cellulose, carboxymethyl cellulose and its blends with styrene-butadiene rubber, polyacrylonitrile, ethylene propylene diene terpolymers (EPDM), styrene-butadiene rubbers (SBR), polyimides, ethylene-vinyl acetate copolymers. In an embodiment, the binding compound is polyvinylidene fluoride. The negative and positive electrodes do not need to have the same binding compound. In an embodiment, the binding compound in the positive electrode is N-methyl pyrrolidone (NMP) and the binding compound in the negative electrode is polyvinylidene fluoride In some embodiments, the mixture of binding compound and active material is at least partially coated on a substrate such that the mixture covers at least 75% of the substrate surface, preferably 80%, 90%, or the entire surface. In an embodiment, the coating is less than 500 nm thick, preferably 100-450 nm, 200-400 nm, or 250-350 nm. The thickness of the coating does not have to be the same for the negative and positive electrodes. In an embodiment, the coating on the positive electrode is 200 nm and the coating on the negative electrode is 100 nm. In an embodiment, the coating on the positive electrode is 200 nm and the coating on the negative electrode is 200 nm. In an embodiment, the positive electrode comprises a substrate at least partially coated on one face with a binding compound and carbonaceous material and the negative electrode comprises a substrate at least partially coated on one face with a binding compound and m-$WO_3$, such that the faces coated with the m-$WO_3$ nanoplates and carbonaceous material are in direct contact with a porous separator.

A method of making the ASC is disclosed. The order in which the method is described is not intended to be construed as a limitation, and any number of the described method steps can be combined in any order to implement the method. Additionally, individual steps may be removed or skipped from the method without departing from the spirit and scope of the present disclosure.

In an embodiment, the ASC are made by mixing a carbonaceous material with a binding compound in a polar aprotic solvent and stirring for at least 3 hours to form a carbonaceous slurry. In an embodiment, the method includes mixing the m-$WO_3$ nanoplates with a binding compound in a polar aprotic solvent and stirring for at least 3 hours to form a m-$WO_3$ nanoplates slurry. Polar aprotic solvents lack a labile hydrogen and have an electric dipole moment such as but not limited to acetone, acetonitrile, dichloromethane, dimethylformamide, dimethyl sulfoxide, ethyl acetate and tetrahydrofuran. In an embodiment, the polar aprotic solvent is dimethyl sulfoxide. The polar aprotic solvent does not need to be the same for the carbonaceous slurry and the m-$WO_3$ nanoplates slurry. In an embodiment, the polar aprotic solvent for the carbonaceous slurry is dimethyl sulfoxide, and the polar aprotic solvent for the m-$WO_3$ nanoplates slurry is tetrahydrofuran.

In an embodiment, the method of making the ASC includes coating a layer of the carbonaceous slurry onto a substrate to form a carbonaceous electrode. In an embodiment, the method includes coating a layer of the m-$WO_3$ nanoplates slurry onto a substrate to form a m-$WO_3$ nanoplates electrode. In one embodiment, the coating is performed using an automatic coating machine. In an embodiment, the method includes drying the carbonaceous electrode and the m-$WO_3$ nanoplates electrode in an oven at a temperature of at least 60° C., preferably 70-90° C., or 77-83° C. for at least 4 hours, preferably 4-6 hours, or 4.5-5 hours to form a dried carbonaceous electrode and a dried m-$WO_3$ nanoplates electrode, respectively.

In an embodiment, the method includes soaking the porous separator in an aqueous solution of the electrolyte for at least 1 hour, preferably 1-5 hours, or 2-3 hours to form an electrolyte porous separator. In an embodiment, the porous separator is at least 80% by surface area submerged in an aqueous solution of the electrolyte, preferably 90%, or fully submerged.

In an embodiment, the method of making the ASC includes combining the dried carbonaceous electrode, the dried m-$WO_3$ nanoplates electrode, and the electrolyte porous separator, such that the substrates are outer layers and the carbonaceous and m-$WO_3$ nanoplates are inner layers separated by the electrolyte porous separator to make an asymmetric nanocomposite supercapacitor.

In one embodiment, the carbonaceous material is HRG and an electrode with HRG active material has a specific capacitance of at least 440 F/g, preferably 400-440 F/g, or 420-430 F/g at a current density of 0.5 A/g. In an embodiment, an electrode with m-$WO_3$ nanoplates as the active material has a specific capacitance of at least 310 F/g, preferably 310-340 F/g, or 320-330 F/g at a current density of 0.5 A/g (FIGS. 7,8). Measurements for the individual electrodes are carried out in a three-electrode system, wherein the substrate is the working electrode, Ag/AgCl (saturated KCl) is the reference electrode, and a platinum wire is the counter electrode. The three-electrode system is in a solution of aqueous electrolyte. In an embodiment, the aqueous electrolyte is 1 M sulfuric acid.

Figure 9A:
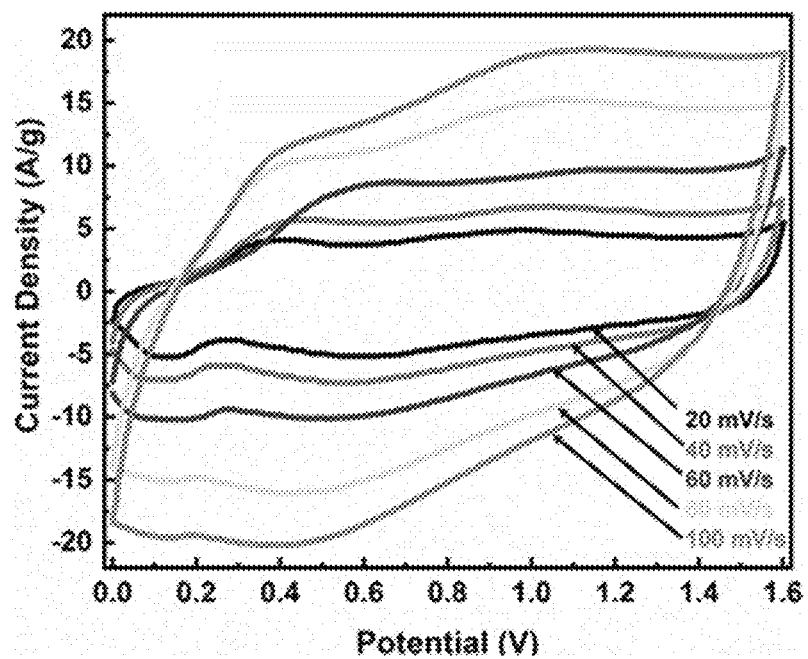
FIGS. 9*a*-9*d* are graphs illustrating the electrochemical performances of the assembled HRG//m-WO$_3$ ASC: (a) CV curves at various scan-rates tested in a maximum OPW from 0.0-1.6 V, (b) CV curves at a constant (20 mV/s) scan-rate with increasing OPWs between 1.0-1.8 V, (c) GCD profiles measured at different current-densities, and (d) C$_{sp}$ vs. scan rate (obtained from the CV curves) and current density (obtained from the GCD profiles)
Figure 9B:
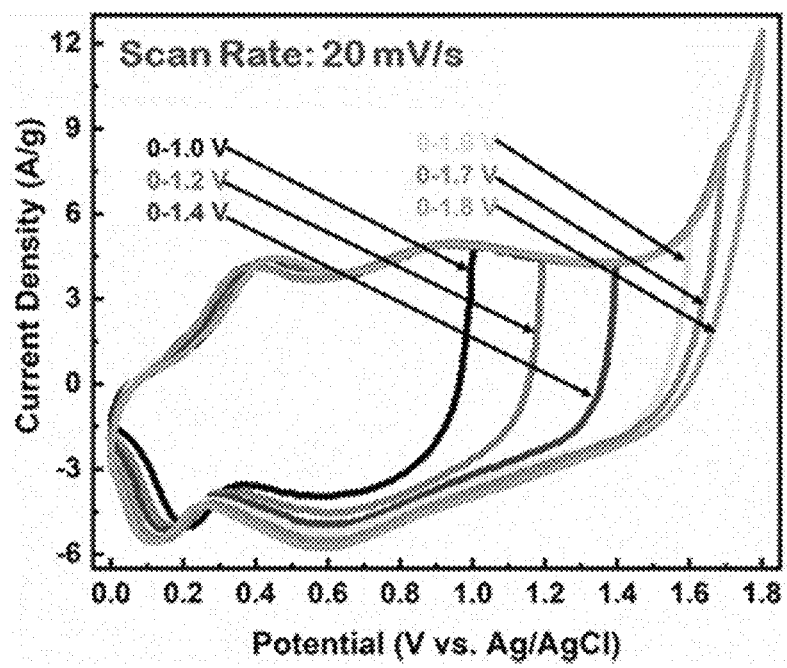
Figure 9C:
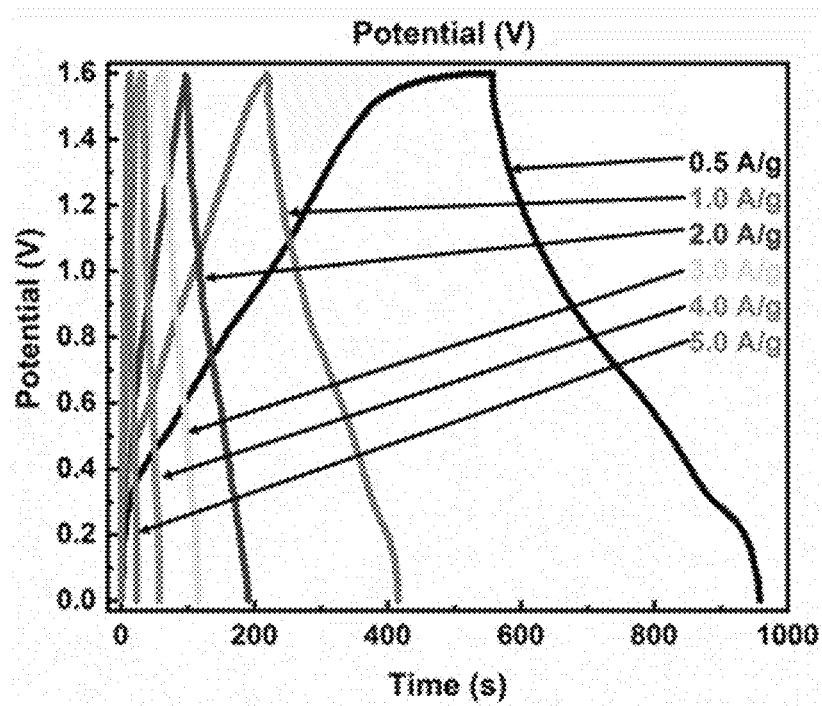

In an embodiment, the ASC with a m-$WO_3$ nanoplates electrode and a HRG electrode, has a specific capacitance of at least 380 F/g, preferably 380-420 F/g, or 390-400 F/g at a current density of 0.5 A/g (FIG. 9). In an embodiment, at least 85%, preferably 90%, or 100% of the initial specific capacitance in the ASC is maintained after 5000 charge-discharge cycles (FIG. 10a). In an embodiment, the ASC has an energy density of at least 90 Wh/kg, preferably 90-110 Wh/kg, or 95-105 Wh/kg, at a power density of 500 W/kg. In an embodiment, the supercapacitor is operated up to 1.8 V, preferably 0-1.7 V, or 0-1.6 V. In an embodiment, 2-10, preferably 3-9, 4-8, or 5-7 of the ASC are connected in parallel and/or series. In another embodiment, the ASC is electrically connected to a sensor in a wearable electronic device. In an embodiment, the electrode comprising the m-$WO_3$ nanoplates is an anode in a lithium-ion battery.

EXAMPLES

The following examples describe and demonstrate an asymmetric nanocomposite supercapacitor (ASC), and the method for making an ASC, and exemplary embodiments of the synthesis of m-$WO_3$ nanoplates described herein. The examples are provided solely for the purpose of illustration and are not to be construed as limitations of the present disclosure, as many variations thereof are possible without departing from the spirit and scope of the present disclosure.

Example 1: Materials and Methods

Materials

All the chemicals and reagents, except stainless steel foil (SSF), were purchased from either Sigma-Aldrich or Alfa-Aesar and used as received, without further purification. SSF was purchased from Tmax Battery Equipments Limited, China and Absorptive Glass Mat (AGM) from Anhui Fengxin Industrial Co., Ltd., China.

Synthesis of m-$WO_3$ Nanoplates $Na_2WO_4 \cdot 2H_2O$ (2.5 g) was dissolved in 6 M aqueous HCl under constant magnetic stirring for 1 hour. To achieve the monoclinic phase of $WO_3$, $NH_4NO_3$ (2.00 g) was added to the 50 mL precursor solution. The contents of the flask were then transferred into a 100 mL Teflon-lined stainless-steel autoclave and kept in a preheated oven at 180° C. for 24 hours. Thereupon, the autoclave was cooled to room temperature, and the resultant greenish yellow precipitates were filtered and washed successively with de-ionized (DI) water (~100 mL) and ethanol (~100 mL), and then dried in an oven at 80° C. for 6 hours to obtain the desired m-$WO_3$ nanoplates.

Synthesis of HRG

The synthesis of HRG was achieved using modified hummers method. See William, S.; Hummers, J.; Offeman, R. E., Preparation of graphitic oxide. *J. Am. Chem. Soc* 1958, 80 (6), 1339-1339, incorporated herein by reference in its entirety. In brief, graphite powder (GP) (0.7 g) and $NaNO_3$ (0.7 g) were added to a cold solution of $H_2SO_4$ (25 mL) at 0° C. After the reaction being stirred for 10 minutes, $KMnO_4$ (2.5 g) was added portion wise to the reaction mixture. The mixture was then stirred at 37° C. for one hour, ensuing formation of the thick paste. The reaction was then added DI water (40 mL) and the stirring was continued for 30 min at 90° C. Thereupon, more DI water (100 ml) was added to the reaction mixture followed by the slow addition of $H_2O_2$ (2.5 mL), which led to change of color of the mixture from dark brown to yellowish. The resultant mixture was then cooled to room temperature, filtered, and washed with DI water (100 mL). The obtained thick brown paste was dispersed in DI water (80 mL) and centrifuged at a low speed (1000 rpm) for 2 minutes. The last step of dispersing the product in DI water and centrifugation was repeated for 4 times, till the clear supernatant layer is achieved. Then, the same step is repeated by increasing the speed (8000 rpm) of centrifugation. The final product in the form of thick past was re-dispersed in DI water using mild-sonication techniques to acquire graphene oxide (GRO) solution for further processing. GRO is then reduced according to a previously reported method by our group. See Khan, M.; Al-Marri, A. H.; Khan, M.; Mohri, N.; Adil, S. F.; Al-Warthan, A.; Siddiqui, M. R. H.; Alkhathlan, H. Z.; Berger, R.; Tremel, W., Pulicaria glutinosa plant extract: a green and eco-friendly reducing agent for the preparation of highly reduced graphene oxide. *RSC Advances* 2014, 4 (46), 24119-24125, incorporated herein by reference in its entirety. Briefly, 100 mg of GRO is dispersed in DI water (30 mL) and sonicated for 30 min. The obtained suspension was allowed to heat at 100° C. and 3 mL of hydrazine hydrate was added. After 2 minutes, the temperature of the reaction was dropped to 98° C. and the stirring was continued for 24 hours. Thereupon, black powder formed was filtered and washed with water (100 mL). Finally, the resultant suspension was centrifuged at slow speed (4000 rpm) for 4 minutes, and the end product was obtained through filtration, which was dried under vacuum.

Fabrication of Working Electrodes and ASC Cell Assembly

The as synthesized HRG and m-WO$_3$ nanoplates based working electrodes were fabricated by mixing 90% of active materials (HRG or m-WO$_3$) with 10% of polyvinylidene fluoride (PVDF) as a binder. PVDF was dissolved in DMSO at 80° C. followed by the slow addition of active material into the solution. The stirring was continued for 4 hours until a homogeneous slurry was attained, which was then casted on SSF (working area of 2×1 cm$^2$), used as a current collector, with the help of an automatic doctor blade film coater (Shandong Gelon Lib Co., Ltd.). Subsequently, the coated electrodes were dried in an electric oven for 5 hours at 80° C. The HRG//m-WO$_3$ ASC was assembled using two electrodes in the sandwich-type cell assembly, where HRG coated SSF was used as a positive electrode and m-WO$_3$ nanoplates coated SSF was used as a negative electrode. Followed by the fabrication of working electrodes, the HRG//m-WO$_3$ ASC was assembled by two electrodes separated by an AGM separator soaked in 1 M H$_2$SO$_4$ aqueous electrolyte.

Electrochemical Measurements

Galvanostatic charge-discharge (GCD), CV and electrochemical impedance spectroscopy (EIS) measurements of the prepared electrodes and HRG//m-WO$_3$ ASC were performed using Autolab/PGSTAT302N Potentiostat/Galvanostat (Metrohm, Based in Utrecht, The Netherlands). The supercapacitor performances of HRG and m-WO$_3$ electrodes were initially evaluated using three electrode system. In an aqueous electrolyte of 1 M H$_2$SO$_4$, HRG or m-WO$_3$ coated on the SSF was used as a working electrode, and Ag/AgCl (Sat's KCl) and a platinum wire were used as a reference and counter electrodes, respectively. The specific capacitances ($C_{sp}$, F/g) were calculated from the CV curves and GCD profiles, employing equation (1) and (2), respectively. See Grundy, M.; Ye, Z., Cross-linked polymers of diethynylbenzene and phenylacetylene as new polymer precursors for high-yield synthesis of high-performance nanoporous activated carbons for supercapacitors, hydrogen storage, and CO2 capture. *J. Mater. Chem. A* 2014, 2 (47), 20316-20330; Hwang, J. Y.; El-Kady, M. F.; Wang, Y.; Wang, L.; Shao, Y.; Marsh, K.; Ko, J. M.; Kaner, R. B., Direct preparation and processing of graphene/RuO$_2$ nanocomposite electrodes for high-performance capacitive energy storage. *Nano Energy* 2015, 18, 57-70; and Mohamedkhair, A. K.; Abdul Aziz, M.; Shaheen Shah, S.; Nasiruzzaman Shaikh, M.; Karrar Jamil, A.; Ameen Ahmed Qasem, M.; Buliyaminu, I. A.; Yamani, Z. H., Effect of an activating agent on the physicochemical properties and supercapacitor performance of naturally nitrogen-enriched carbon derived from Albizia procera leaves. *Arab. J. Chem.* 2020, DOI: https://doi.org/10.1016/j.arabjc.2020.05.017, each incorporated herein by reference in their entirety.

$$C_{sp} = \frac{\int I dv}{2mv\Delta V} \quad (1)$$

$$C_{sp} = \frac{I\Delta t}{m\Delta V} \quad (2)$$

where, $\int I dv$, m, v, $\Delta V$, I, and $\Delta t$ represent the integrated-area under the CV curve over the whole OPW, the mass (g) of active material, the scan rate (mV/s), the OPW (V), the discharging current (A), and the discharging time (s), respectively.

Besides three-electrode cell electrochemical measurements, the fabricated HRG//m-WO$_3$ ASC was also tested using a two-electrode electrochemical system. The $C_{sp}$ were obtained from the CV curves and GCD profiles, using equation (3) and (4), respectively. See Grundy et al.; Hwang et al.

$$C_{sp} = \frac{\int I dv}{mv\Delta V} \quad (3)$$

$$C_{sp} = \frac{2I\Delta t}{m\Delta V} \quad (2)$$

The energy and power densities were determined by employing the equation (5) and (6), respectively. See Shah et al.; Grundy et al.; Hwang et al.

$$E \text{ (Wh/kg)} = \frac{C_{sp} \times \Delta V^2 \times 1000}{2 \times 3600} \quad (5)$$

$$P \text{ (W/kg)} = \frac{E \times 3600}{\Delta t} \quad (6)$$

Where $\Delta V$ is the OPW (V), $C_{sp}$ is in F/g, and $\Delta t$ is the discharging time (s) of the HRG//m-WO$_3$ ASC. The EIS measurements were also performed in the two-electrode system for the fabricated HRG//m-WO$_3$ ASC.

Results and Discussion

Synthesis and Characterization of m-WO$_3$ Nanoplates

Synthesis of m-WO$_3$ nanoplates was achieved as outlined in FIG. 1. Briefly, synthesis of a pure monoclinic phase was achieved by a hydrothermal method, adding 2.00 g of NH$_4$NO$_3$ to 50 mL precursor solution and heating the mixture for 24 hours at 180° C. See Jia et al. In the hydrothermal system, decomposition of the H$_2$WO$_4$ solution (formed by the reaction of Na$_2$WO$_4$·2H$_2$O with HCl) resulted in the formation of WO$_3$ nuclei, which in turn served as seeds to gradually grow into WO$_3$ nanoplates.

Phase purity and crystal structure of the as-synthesized m-WO$_3$ nanoplates was first characterized by X-ray diffraction (XRD). As indicated in FIG. 2a, all the reflections of the hydrothermally synthesized m-WO$_3$ nanoplates match well with the phase pure monoclinic WO$_3$ comparing to standard (JCPDS No. 83-0950). See Long, C.; Li, Q.; Li, Y.; Liu, Y.; Li, A.; Zhang, Q., Adsorption characteristics of benzene—chlorobenzene vapor on hypercrosslinked polystyrene adsorbent and a pilot-scale application study. *Chem. Eng. J.* 2010, 160 (2), 723-728, incorporated herein by reference in its entirety. The well define and sharp reflection intensities indicate good crystallinity of product. The highly intense (002) reflection centered at 23° indicates the anisotropic growth of monoclinic WO$_3$ structure along the c-axis. For controlling the structure characteristic of m-WO$_3$, the addition of NH$_4$NO$_3$ at different concentration plays an important role such that an increasing concentration of NH$_4$NO$_3$ enhances the reflections at (022) and (202) planes (a-axis) and reduces peaks at (120) and (112) planes (b-axis), resulting in the formation of m-WO$_3$ nanoplates.

Figure 2B:
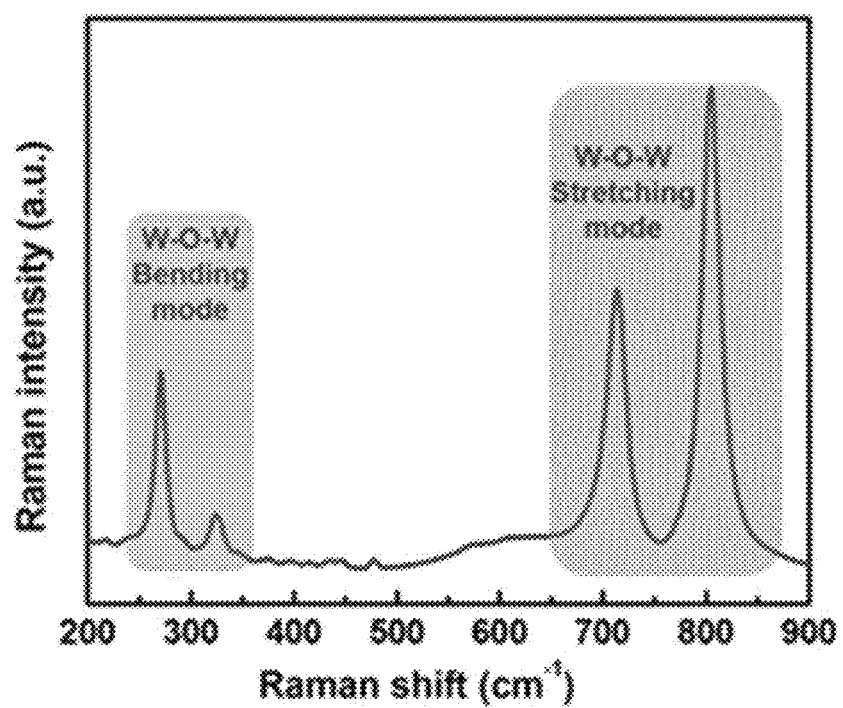

The crystal structure of the as-prepared m-WO$_3$ nanoplates was further confirmed, using Raman spectroscopy (FIG. 2b). The Raman peaks in the spectrum are in agreement to the monoclinic phase. Moreover, peaks centered at 135 and 185 cm$^{-1}$ were attributed to structural chains of (W$_2$O$_2$)$_n$. Likewise, the characteristic bands at 270 and 330 cm$^{-1}$ were due to the W—O—W bending vibrations. The sharp frequency peaks centered at 715 cm$^{-1}$ and 810 cm$^{-1}$ were assigned to the W—O—W stretching modes of vibrations.

The size and morphology of the as synthesized WO$_3$ nanoplates were confirmed using field emission scanning electron microscopy (FESEM). The overview FESEM image (FIG. 3a) indicates plate like morphology. Furthermore, the high resolution FESEM micrograph (FIG. 3b) yielded the dimensions of the nanoplates. The elemental mapping analysis, using energy dispersive spectroscopy (EDS), of the synthesized m-WO$_3$ nanoplates revealed the homogeneous composition of the product.

Synthesis and Characterization of HRG

HRG was prepared as outlined in FIG. 4.

The crystalline nature and phase purity of the as-synthesized HRG were ascertained using XRD analysis. The XRD diffractogram of GP (FIG. 5a) displayed a highly intensive and narrow peak reflection at 2θ=26.4°. Similarly, the HRG diffractogram showed a broad reflection at 2θ=26.4°, which constitute the 002 diffractions of graphene layers having 0.34 nm d spacing. However, during the oxidation process different oxygen based functional groups were integrated within the nanosheets of carbon, which shifted the GRO peak reflection into a lower Bragg angle of 2θ=10.9°. On the other hand, a large number of H$_2$O molecules were inserted between the graphene layers, which led to an increase (almost doubled that of GP) in the d spacing of GRO to ~0.79 nm. Nevertheless, the reflection peak of GRO at 10.9° vanished in the HRG due to the reduction, which indicates that oxygen comprising functional groups have been mostly removed.

Figure 5B:
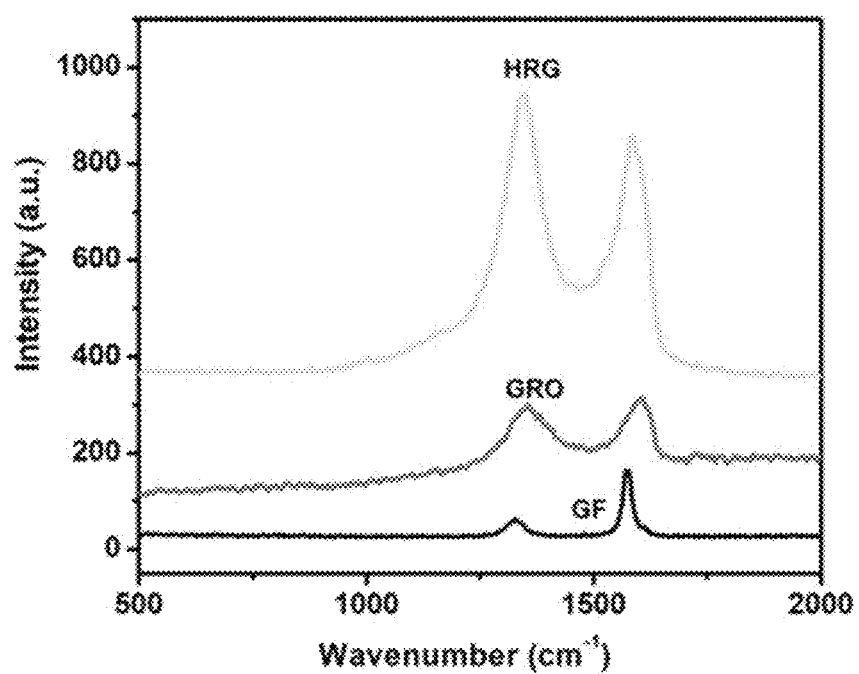

The Raman spectra of GP, GRO, and HRG are presented in FIG. 5b. The GP (black line) spectrum shows a strong G and less intense D bands centered at 1589 cm$^{-1}$ and 1345 cm$^{-1}$, respectively. After oxidation, GRO showed two bands which were broadened and slightly red-shifted by 10 cm$^{-1}$. After the reduction of GRO to HRG, the intensity of the D band increased, increasing the relative intensity ratio of the D/G bands. This indicates that the formation of SP2 domains is more pronounced in HRG compared to GRO, because of the reduction of GRO to HRG. The reduction of GRO to HRG was also confirmed using X-ray photoelectron spectroscopy (XPS). The core-level signals for C 1s XPS spectrum of HRG, (not shown) shows four peaks corresponding to the four different carbon bonds. The strong peak centered at 284.8 eV correspond to the sp2 carbon that is, C═C bond in graphene skeleton. The peaks located at a position approximately 285.9 eV and 289 eV, are due to the C—O bond and C═O bond, respectively. The significant decrease in the peak intensities related to oxygen containing functional groups in C 1s spectrum, indicate considerable reduction. See Khan et al. (2015).

The surface topology and layering nature of HRG was confirmed by FESEM and transmission electron microscopy (TEM). The FESEM micrograph (FIG. 6a) revealed the layered structure of HRG. Likewise, the TEM image (FIG. 6b) indicated that HRG was composed of few layers thick graphene sheets.

Figure 7A:
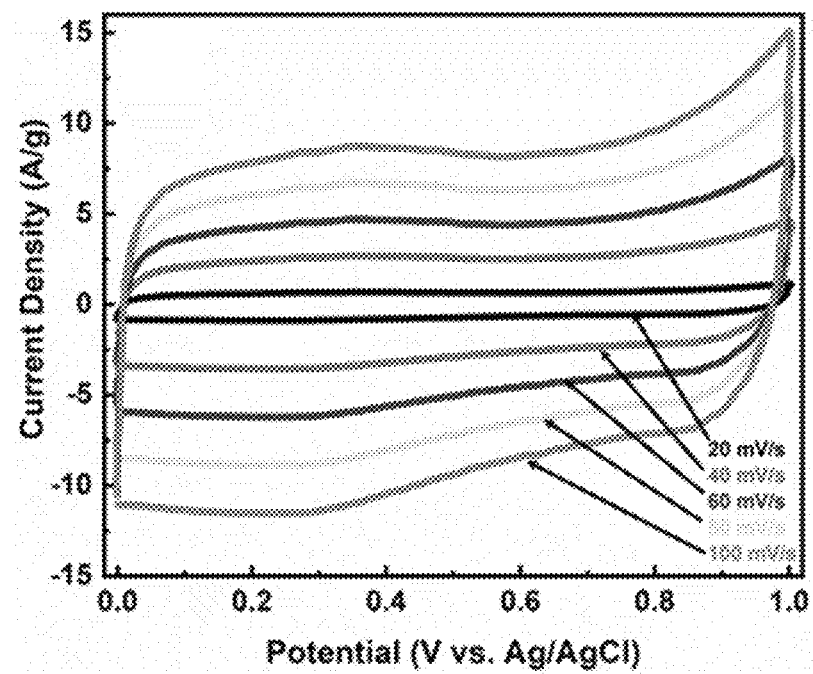
FIGS. 7*a*-7*d* are graphs illustrating the electrochemical performances of the prepared electrodes in the three-electrode system: CV curves of the (a) HRG and (b) m-WO$_3$ electrodes at various scan-rates, (c) comparative CV curves of HRG and m-WO$_3$ electrodes obtained at a scan-rate of 100 mV/s, and (d) specific capacitances calculated at various scan rates, for each electrode, in 1 M H$_2$SO$_4$.

Electrochemical Performance Evaluation of HRG and m-WO$_3$ Based Supercapacitors Initially, the electrochemical performance of the prepared HRG and m-WO$_3$ electrodes was individually evaluated through a three-electrode electrochemical cell in aqueous electrolyte, containing 1 M H$_2$SO$_4$ at various scan-rates and OPWs. The CV curves of HRG electrode were recorded at different scan-rates from 20-100 mV/s within an OPW from 0.0-1.0 V (vs. Ag/AgCl) (FIG. 7a). The HRG electrode exhibited a capacitance behavior with the presence of symmetrical quasi-rectangular shapes CV curves, due to the pure EDLC behavior, is a characteristic of a good reversible supercapacitor performance. See Lee, J.-S. M.; Briggs, M. E.; Hu, C.-C.; Cooper, A. I., Controlling electric double-layer capacitance and pseudocapacitance in heteroatom-doped carbons derived from hypercrosslinked microporous polymers. *Nano Energy* 2018, 46, 277-289, incorporated herein by reference in its entirety. These results indicated fast ion diffusion and rapid transport during charging and discharging with a fast-current response to the change of potential from 0.0-1.0 V (vs. Ag/AgCl). In addition, the current densities and the area under the corresponding CV curves increased with increase in scan-rate, in order to keep the C$_{sp}$ constant. Equation 1 was used to calculate the C$_{sp}$ of HRG electrode at scan-rates of 20.0, 40.0, 60.0, 80.0, and 100.0 mV/s, which produced the corresponding C$_{sp}$ of 472, 449, 395, 302, and 256 F/g, respectively.

Figure 7B:
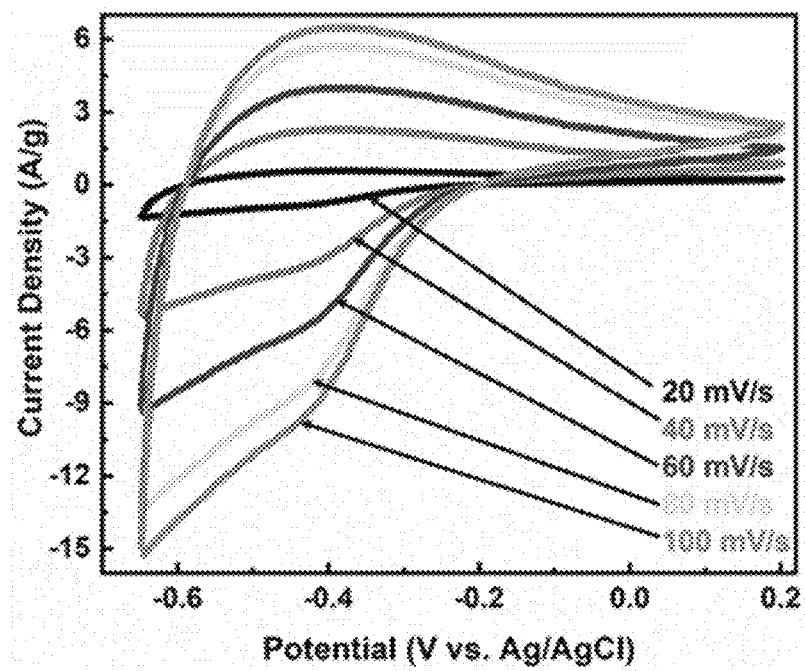
Figure 7C:
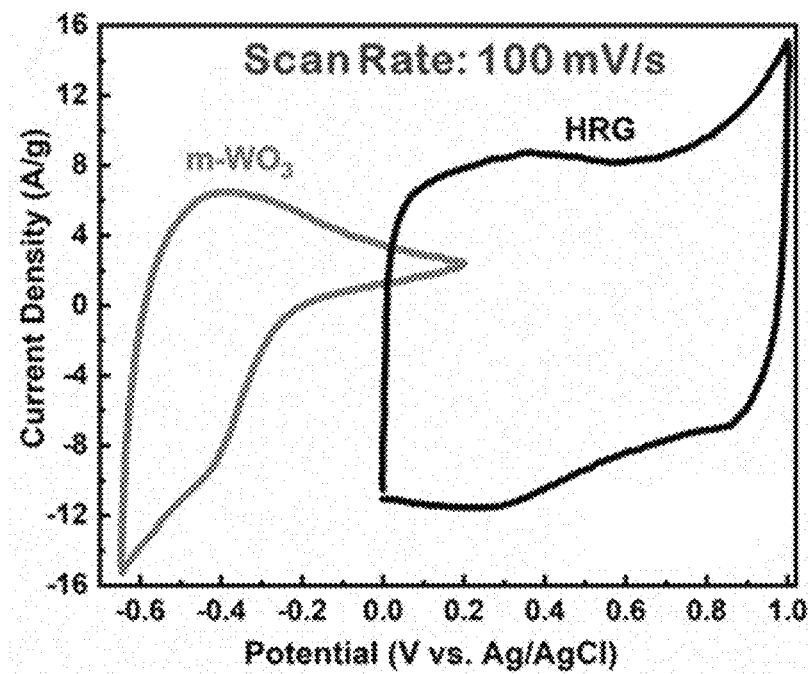
Figure 7D:
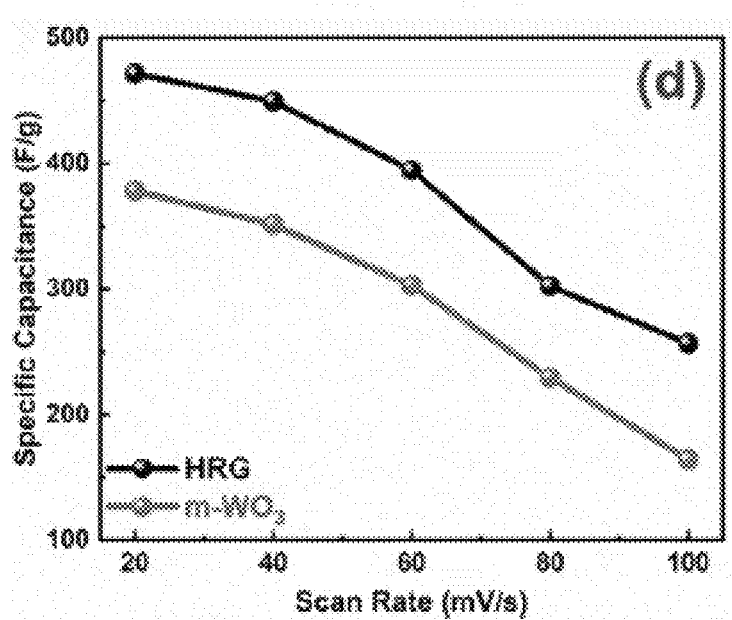

To study the electrochemical performance of m-WO$_3$ electrode, CV measurements were conducted in aqueous electrolyte of 1 M H$_2$SO$_4$, using a three-electrode electrochemical system. FIG. 7b indicates the CV curves of the m-WO$_3$ electrode at different scan-rates from 20-100 mV/s over an OPW from −0.65 to 0.2 V. The dolphin-like CV curves of m-WO$_3$ electrode exhibited characteristics redox peaks of m-WO$_3$ at around −0.41 V of the cathodic scan and −0.36 V of the anodic scan. See Qu, H.; Zhang, X.; Zhang, H.; Tian, Y.; Li, N.; Lv, H.; Hou, S.; Li, X.; Zhao, J.; Li, Y., Highly robust and flexible WO3·2H2O/PEDOT films for improved electrochromic performance in near-infrared region. *Sol. Energy Mater. Sol. Cells* 2017, 163, 23-30; and Farsi, H.; Gobal, F.; Barzgari, Z., A study of hydrated nanostructured tungsten trioxide as an electroactive material for pseudocapacitors. *Ionics* 2013, 19 (2), 287-294, each incorporated herein by reference in their entirety. These redox-peaks may be attributed to the reversible intercalation/deintercalation of H$^+$ ions into/out of the m-WO$_3$ structure during the charging and discharging process. The charge-discharge mechanism of m-WO₃ electrode in the H₂SO₄ solution may be explained as; during the charging process the insertion of H⁺ ions takes place whereas the desertion of H⁺ ions occurs in the discharge process, as mentioned in equation (7).

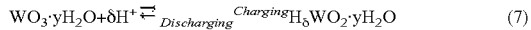
$$WO_3 \cdot yH_2O + \delta H^+ \underset{Discharging}{\overset{Charging}{\rightleftarrows}} H_\delta WO_2 \cdot yH_2O \tag{7}$$

In addition, the current densities increased with increase scan rates and the anodic peaks were shifted to higher position in the applied OPW. Likewise, the cathodic peaks also shifted positions in the applied OPW. These outcomes showed excellent electrochemical performance of m-WO₃ electrode with a pseudocapacitance behavior. The $C_{sp}$ of m-WO₃ electrode were measured from the CV curves, using equation 1, and the acquired $C_{sp}$ were found to be 378, 351, 303, 229, and 164 F/g at the scan-rates of 20, 40, 60, 80, and 100 mV/s, respectively.

The CV performance of the prepared HRG and m-WO₃ electrodes were also analyzed separately in 1 M H₂SO₄, in order to assess the appropriate OPW of the prepared negative and positive electrodes before the evaluation of the HRG//m-WO₃ ASC. This was in line with the CV curves of each electrode at a scan rate of 100 mV/s (FIG. 7c), HRG electrode exhibited a stable OPW between 0 and 1.0 V whereas the m-WO₃ electrode displayed a stable OPW between −0.65 and 0.2 V. Consequently, it was estimated that the OPW may be extended to approximately 1.6 V upon assembling both the prepared electrodes in the form of HRG//m-WO₃ ASC. Likewise, the oxidation peak in the CV related to m-WO₃ electrode at around −0.4 V (vs. Ag/AgCl) represent its pseudocapacitance behavior and could be attributed to the H+ insertion/storage in nanostructured m-WO₃ and also responsible for the reduction of $W^{6+}$ and $W^{5+}$. The small reduction peak in the CV of HRG at around 0.3V may be attributed the irreversible reactions of oxygen functional groups attached to the HRG. (FIG. 7d) shows the relationship between the specific capacitance and CV scan rate. The specific capacitance for both electrodes decreased with increasing CV scan rate. The lower values of the specific capacitance at high CV scan rates may be due to the slower ion diffusion at the electrode surface.

Figure 8A:
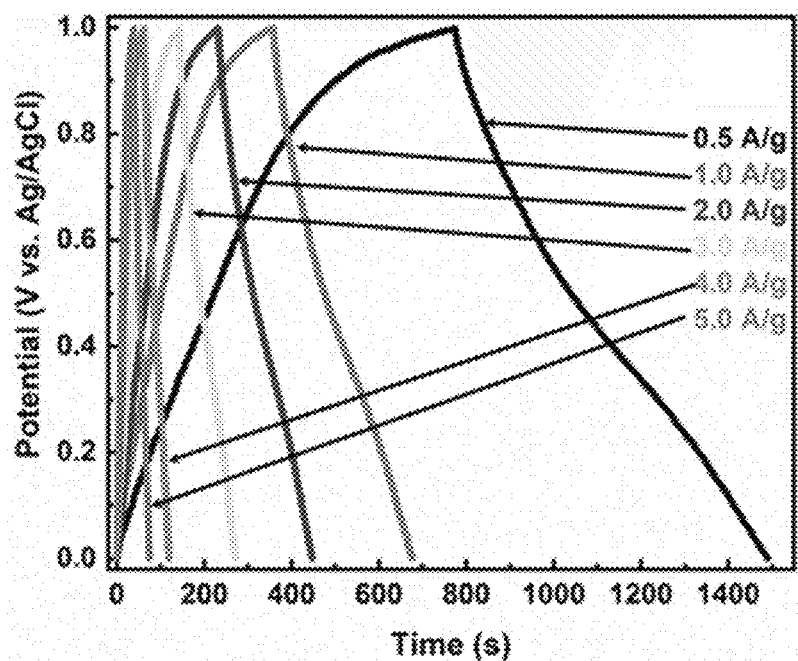
FIGS. 8*a*-8*d* are graphs illustrating the electrochemical performances of the prepared electrodes in a three-electrode system: GCD profiles of (a) HRG and (b) m-WO$_3$ electrodes at various current-densities, (c) comparative GCD profiles of HRG and m-WO$_3$ electrodes measured at a 0.5 A/g current-density, and (d) C$_{sp}$ measured at various current-densities, for each electrode, in 1 M H$_2$SO$_4$.
Figure 8B:
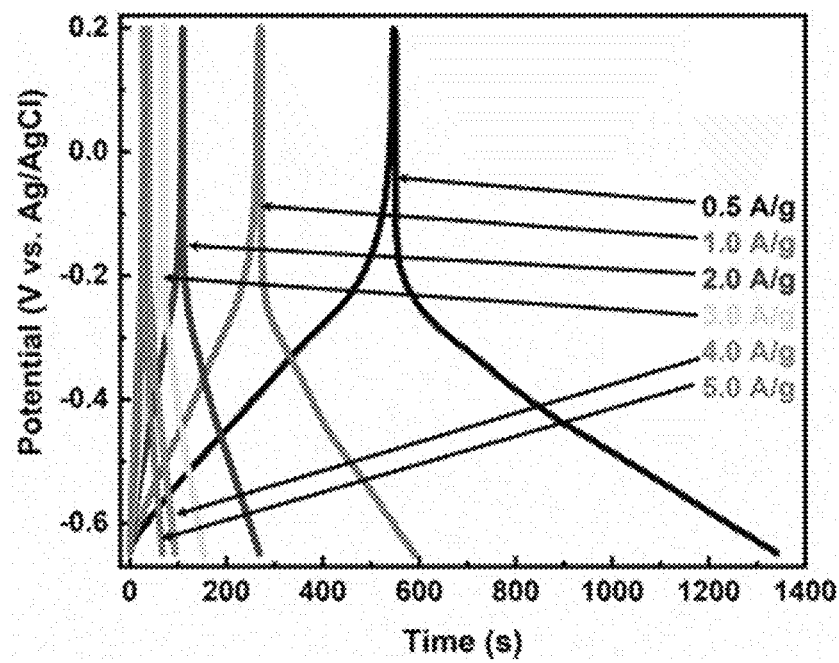
Figure 8C:
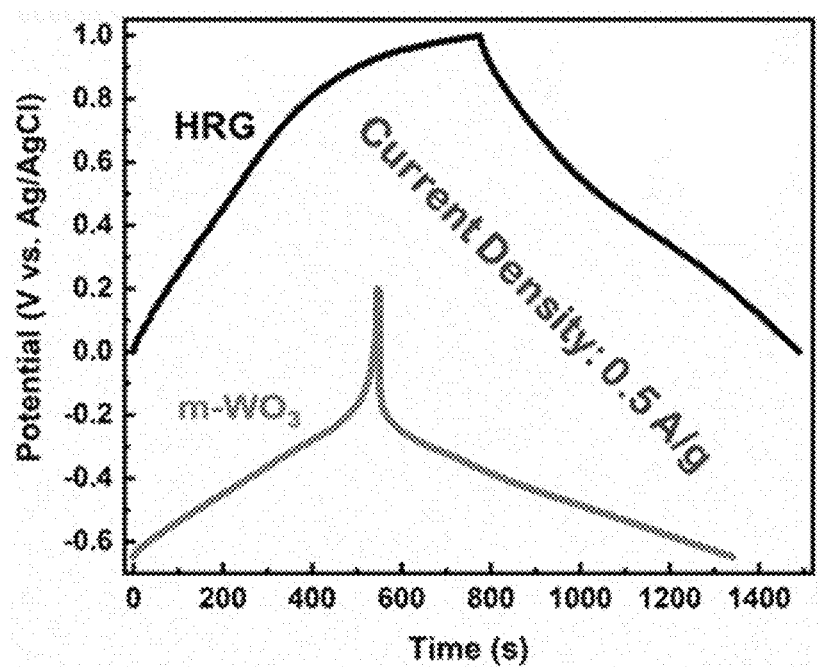
Figure 8D:
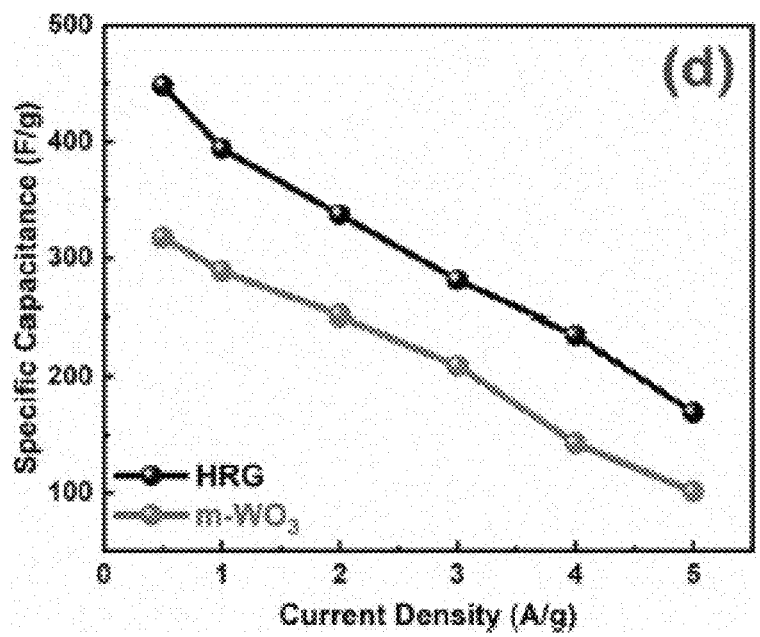

GCD measurements were performed to investigate the charging and discharging rate-performance of HRG and m-WO₃ electrodes in a three-electrode system in 1 M H₂SO₄. The GCD profiles of the HRG electrode were studied at different current-densities, ranging from 0.5-5.0 A/g in an OPW and from 0.0-1.0 V (vs. Ag/AgCl), as shown in FIG. 8a. All the GCD curves possess a symmetrical shape that correspond to the typical pattern of carbon-based capacitive behavior. Furthermore, similar to the CV measurements, the GCD curves of HRG electrode, being nearly isosceles-triangular in shape with good linearity, also confirm their EDLC behavior. See Ren, Z.; Li, J.; Ren, Y.; Wang, S.; Qiu, Y.; Yu, J., Large-scale synthesis of hybrid metal oxides through metal redox mechanism for high-performance pseudocapacitors. Sci. Rep. 2016, 6, 20021, incorporated herein by reference in its entirety. The $C_{sp}$ of the HRG electrode at different current-densities were measured from the GCD profiles, employing equation 2. The HRG electrode exhibited $C_{sp}$ within the range from 448 F/g-169 F/g at current densities of 0.5-5.0 A/g (FIG. 8a). Likewise, GCD curves of m-WO₃ electrode (FIG. 8b) at different current-densities from 0.5-5.0 A/g in the OPW and from −0.65 to 0.2 V showed non-linearities, owing to the pseudocapacitive behavior. In addition, the GCD profiles displayed the existence of plateau regions in the range of OPW above −0.18. This, in turn, was in agreement with the observed decrease in the current densities at redox potentials in the CV curves (FIG. 7b). The $C_{sp}$ calculated from equation 2 based on discharge profiles were ranged from 317 F/g-101 F/g at current densities of 0.5-5.0 A/g. To identify the best working OPW, prior to the development of the HRG//m-WO₃ ASC, separate GCD measurements of HRG and m-WO₃ electrodes were compared, which was recorded at 0.5 A/g as depicted in FIG. 8c. Since, the HRG and m-WO₃ electrodes possess stable OPWs from 0.0 to 1.0 V and −0.65 to 0.2 V, respectively, it was anticipated that the maximum OPW for the assembled HRG//m-WO₃ ASC cell can reach to 1.6 V.

One of the most appealing characteristics of supercapacitors is their capacity to operate at high current densities. A comparison of the specific capacitances measured at different current-densities for both the prepared electrodes illustrated in FIG. 8d. The specific capacitances were observed to be decreasing with the increase in current densities for both the HRG and m-WO₃ electrodes. Nevertheless, high specific capacitances with better charging and discharging times, with respect to most of the available literature were achieved for both these electrodes, which hinted superior capacitance performances.

To assess the supercapacitor performance of the prepared HRG and m-WO₃ electrodes in 1 M H₂SO₄, an HRG//m-WO₃ ASC was fabricated by assembling m-WO₃ as a negative-electrode and HRG as a positive-electrode, respectively. The fabricated ASC showed that HRG and m-WO₃ electrodes exhibited OPW between 0.0 to 1.0 V and −0.65 to 0.2 V, respectively, which hinted the OPW for the HRG//m-WO₃ ASC to be 1.6 V. These results are in well agreement with the measurements carried out using CV and GCD of single electrodes (FIG. 7). Therefore, the assembled HRG//m-WO₃ ASC was tested in an OPW from 0.0 to 1.6 V. Interestingly, the width of the OPW by the two-electrode system was well-matched with the OPW by the three-electrode system. CV measurements of the fabricated HRG//m-WO₃ ASC were performed at various scan-rates from 20-100 mV/s, as shown in FIG. 9a. The CV curves displayed symmetric quasi-rectangular shapes with the characteristics of Faradaic pseudocapacitance behavior, showing an ideal fast charge-discharge capacitive performance. Moreover, the CV curves revealed clear redox peaks in the OPW ranging from 0.1 to 0.5 V and also verified the pseudocapacitor performance of the m-WO₃ electrode. By employing equation 3, the specific capacitances were calculated from the CV measurements of the fabricated HRG//m-WO₃ ASC. At scan-rates of 20, 40, 60, 80, and 100 mV/s, the specific capacitances were found to be 426, 412, 377, 286, and 190 F/g, respectively. These values were found to be greater than those of the individual HRG and m-WO₃ electrodes. Similarly, the CV curves exhibited a distinctive trend, i.e. with an increase in scan-rate, the current densities as well as the respective area under the corresponding CV curve were increased. These outcomes keep the $C_{sp}$ constant. The reversibility and stable OPW of the fabricated HRG//m-WO₃ ASC were tested in different OPWs from 1.0-1.8 V at a scan-rate of 20 mV/s. As shown in FIG. 9b, the OPW of the fabricated HRG//m-WO₃ ASC may be extended to 1.8 V due to the combination of an EDLC electrode and a pseudo-capacitor electrode. The HRG//m-WO₃ ASC exhibits a typical capacitive behavior in all the tested OPWs from 1.0 V-1.6 V, with quasi-rectangular CV curves, showing the ideal capacitance performance with good reversibility. However, once the OPW was raised to higher than 1.6 V, the current-densities were dramatically enhanced, owing to the decomposition of electrolyte with hydrogen/oxygen evolution reactions. Hence, it was concluded that the optimum stable OPW for the supercapacitor performance of HRG//m-WO$_3$ ASC was from 0.0 to 1.6 V. Furthermore, the supercapacitor evaluation of HRG//m-WO$_3$ ASC was also assessed by the GCD technique at different current-densities, ranging from 0.5-5.0 A/g in an OPW from 0.0-1.6 V (FIG. 9c). The symmetrical nature of all the GCD profiles show the electrochemical-reversibility and existence of an EDLC behavior, in addition to the fast redox reaction at the surface of the electrodes, indicating excellent capacitive performance for HRG//m-WO$_3$ ASC.

In agreement with the CV measurements, the pseudocapacitance performance of the m-WO$_3$ electrode was also validated by the plateau-region in the GCD profiles (FIG. 9c). The fast redox reactions occur due to charge-transfer and the formation of an EDL at the EEI. Employing equation 4, the specific capacitances calculated from the GCD profiles of HRG//m-WO$_3$ ASC and the obtained $C_{sp}$ were ranging from 389 F/g-138 F/g at current densities of 0.5-5.0 A/g. During the GCD cycle, the electrical potential difference between the two ends of a conducting phase is called IR drop (Vdrop). A very small IR drop can be seen in the HRG//m-WO$_3$ ASC, which can be attributed to the low charge transfer resistance value (0.35 W, measured from the Nyquist plot), a key consideration for high power applications.

Figure 9D:
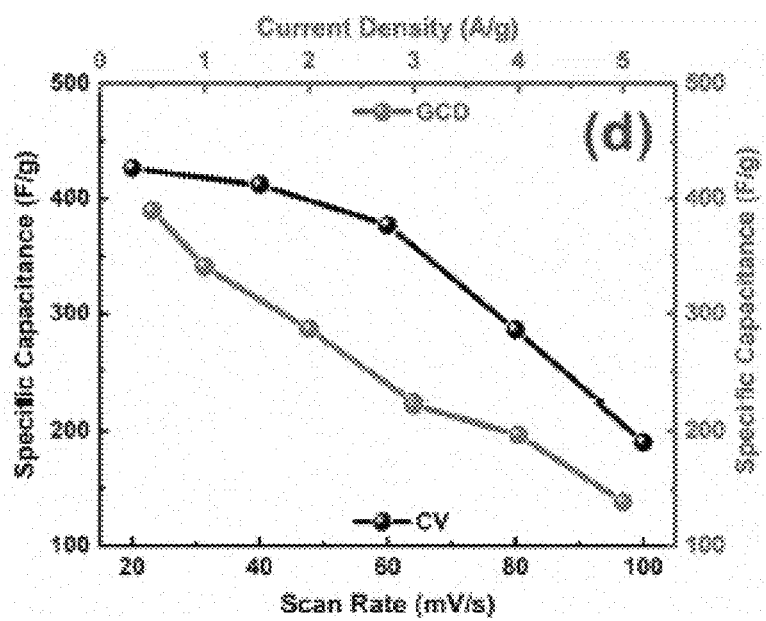
Figure 10A:
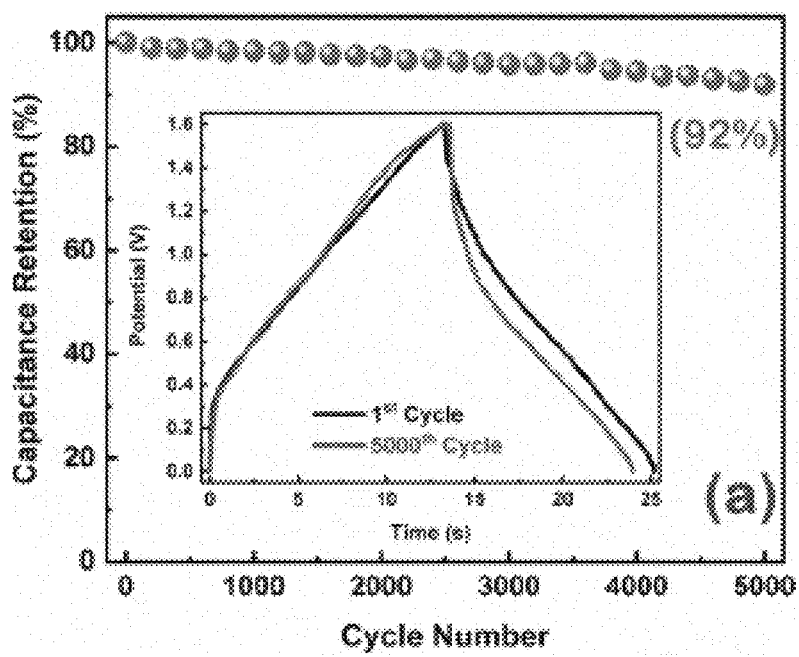
FIGS. 10*a*-10*c* are graphs illustrating (a) Long term GCD cycling-stability recorded at 5.0 A/g current-density showing ~92% stability in C$_{sp}$ after 5000 GCD cycles (Inset is the GCD profiles of the 1$^{st}$ and 5000$^{th}$ cycles), (b) Ragone-plot comparing energy density and power density of HRG//m-WO$_3$ ASC with other reported ASCs in the literature, and (c) Nyquist plots after 1$^{st}$ and 5000$^{th}$ cycles (Inset is a magnified region of the Nyquist plots at the high-frequency range), of the fabricated HRG//m-WO$_3$ ASC.

FIG. 9d presents the $C_{sp}$ values as a function of scan-rate (measured from the CV curves) and current-densities (measured from the GCD profiles), for HRG//m-WO$_3$ ASC. It is evident that the $C_{sp}$ value increases with increase in both scan-rates as well as current densities value. It has been reported that increasing current density or scan rate does not give to charges enough time to migrate through the electrodes and thus produce a lower specific capacitance. Therefore, slowing down the current density or scan-rate may enable electrolyte ions to penetrate into the electrodes more systematically and to produce better contact with the internal-surface of the electrode material, and therefore produce a larger $C_{sp}$. See Fuertes, A. B.; Pico, F.; Rojo, J. M., Influence of pore structure on electric double-layer capacitance of template mesoporous carbons. J. Power Sources 2004, 133 (2), 329-336, incorporated herein by reference in its entirety. Specific capacitance values extracted from GCD and CV measurements are compiled in Table 1.

GCD cycles are presented in FIG. 10(a). The HRG//m-WO$_3$ ASC retained ~92% of its original $C_{sp}$ even after 5000 GCD cycles, demonstrating its highly stable charge storage capability. The GCD curves maintained their quasi-triangular shape with almost similar discharging time over 5000 GCD cycles. For comparison, the 1$^{st}$ and 5000$^{th}$ GCD cycles are displayed in the inset of FIG. 10a.

Figure 10B:
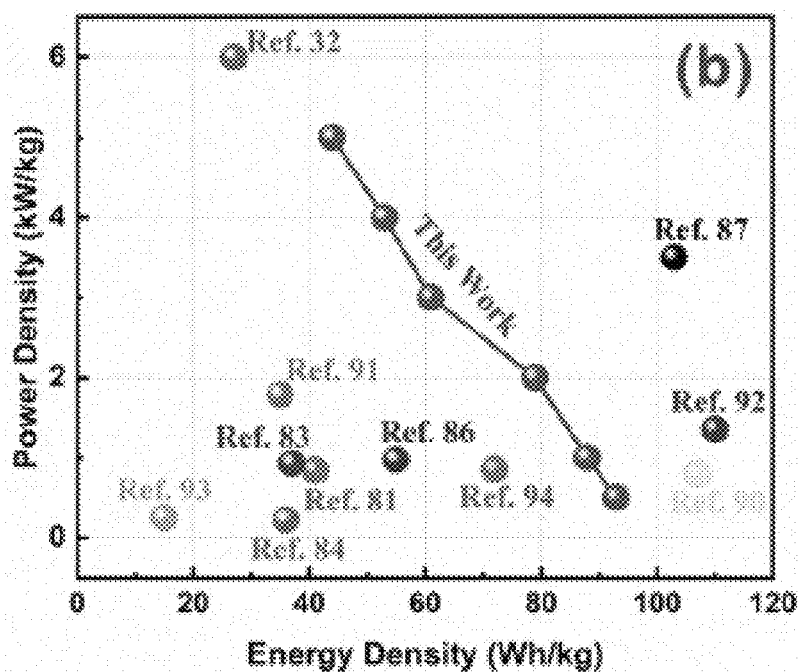
Figure 10C:
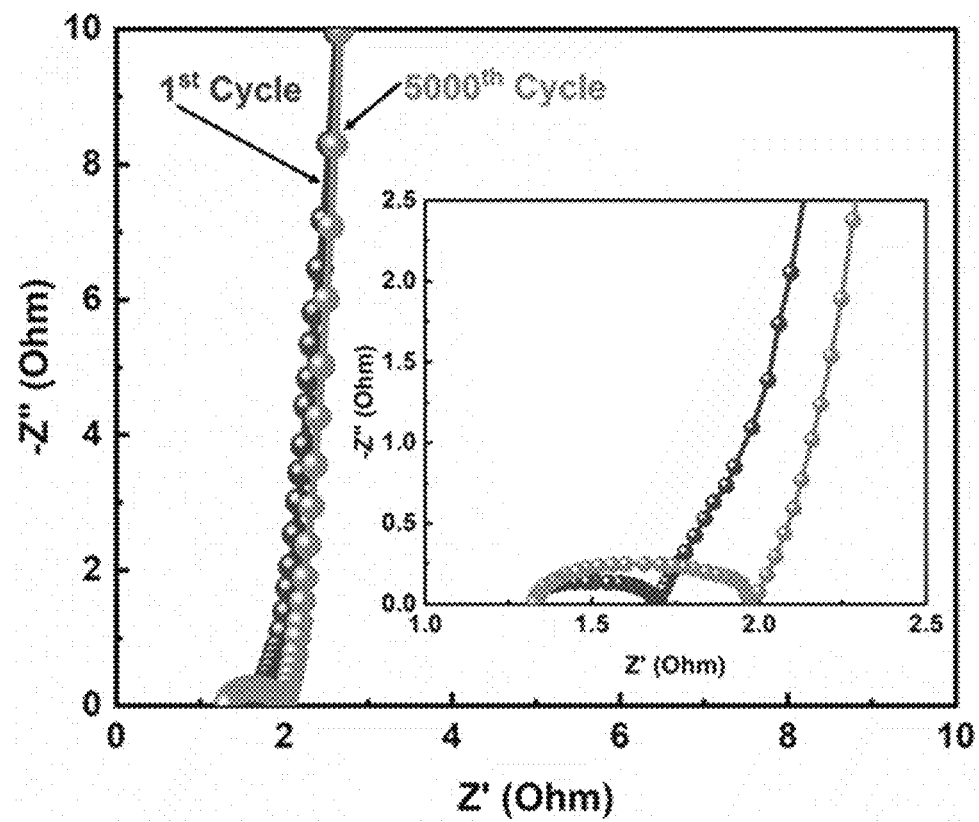

Energy and power densities in the form of a Ragone plot are mostly utilized as key factors to describe the performance of a supercapacitor. The Ragone plot comparing power density versus energy density for this work and previously reported asymmetric supercapacitors illustrated in FIG. 10b. The energy and power densities of HRG//m-WO$_3$ ASC were calculated using equation 5 and equation 6, respectively. These results revealed a maximum energy density of 93 Wh/kg for the fabricated HRG//m-WO$_3$ ASC at the power density of 500 W/kg. However, the energy density remained 44 Wh/kg at a high power density of 5000 W/kg. The energy density and power density of HRG//m-WO$_3$ ASC are higher than most of the previously reported ASCs (Table 2). This exceptional supercapacitor performance of HRG//m-WO$_3$ ASC can be attributed to the low-diffusion resistance and low charge-transfer resistance ($R_{ct}$) of the electrodes, as described in the EIS results. EIS is a valuable technique to reveal the electronic conductivity of supercapacitors during the charge-discharge process. Therefore, EIS measurement was carried out to further illustrate the advantages of HRG//m-WO$_3$ ASC. EIS measurements were recorded at the frequency ranges from 1.0 Hz to 1.0 MHz at an open-circuit-potential of 5 mV impedance amplitude. FIG. 10c shows the Nyquist plots of HRG//m-WO$_3$ ASC with an inset for the sack of comparison of the EIS plots after the 1$^{st}$ and 5000$^{th}$ cycles. The Nyquist-plots contain a semi-circle and a nearly straight line in the high- and low-frequency ranges, respectively. Moreover, the diameter of the semi-circle on the abscissa of the Nyquist-plot in the high-frequency range of the electrochemical system represents the charge-transfer resistance ($R_{ct}$). See Gu, Y.; Fan, L.-Q.; Huang, J.-L.; Geng, C.-L.; Lin, J.-M.; Huang, M.-L.; Huang, Y.-F.; Wu, J.-H., N-doped reduced graphene oxide decorated NiSe2 nanoparticles for high-performance asymmetric supercapacitors. J. Power Sources 2019, 425, 60-68, incorporated herein by reference in its

TABLE 1

The specific capacitances of the HRG electrode, the m-WO$_3$ electrode, and the HRG//WO$_3$ ASC, measured at different scan rates (from CV curves) and current-densities (from GCD profiles).

| Scan Rate (mV/s) | Specific Capacitance (F/g) | | | Current Density (A/g) | Specific Capacitance (F/g) | | |
|---|---|---|---|---|---|---|---|
| | HRG electrode | m-WO$_3$ electrode | HRG//m-WO$_3$ ASC | | HRG electrode | m-WO$_3$ electrode | HRG//m-WO$_3$ ASC |
| 20 | 472 | 378 | 426 | 0.5 | 448 | 317 | 389 |
| 40 | 449 | 351 | 412 | 1.0 | 394 | 288 | 341 |
| 60 | 395 | 303 | 377 | 2.0 | 337 | 251 | 286 |
| 80 | 302 | 229 | 286 | 3.0 | 281 | 209 | 223 |
| 100 | 256 | 164 | 190 | 4.0 | 235 | 143 | 197 |
| | | | | 5.0 | 169 | 101 | 138 |

Electrochemical stability and long-term cycling performance are another important criterion to evaluate supercapacitors for practical applications. The cycling performance of HRG//m-WO$_3$ ASC was tested in a maximum OPW from 0.0-1.6 V at a constant current density of 5.0 A/g for 5000 continuous GCD cycles (FIG. 10a). The $C_{sp}$ at every 200$^{th}$ cycle was calculated and the respective values up to 5000 entirety. Moreover, the smaller value of $R_{ct}$ indicates the higher transfer or diffusion rates of ions into the electrodes. See Vellacheri, R.; Al-Haddad, A.; Zhao, H.; Wang, W.; Wang, C.; Lei, Y., High performance supercapacitor for efficient energy storage under extreme environmental temperatures. Nano Energy 2014, 8, 231-237, incorporated herein by reference in its entirety. Similarly, the intercept of the Nyquist-plot on the abscissa at high frequency signifies the equivalent series resistance (ESR), related to the summation of the intrinsic-resistance of the electrode-material, electrolyte-solution-resistance, and contact resistance at the EEI. The $R_{ct}$ values measured from the diameter of the semi-circle were found to be 0.35 and 0.62 ohms after $1^{st}$ and $5000^{th}$ cycles, respectively. Whereas the straight line at the lower frequency ranges represents the diffusion behavior of the electrolyte ions in the electrodes, the vertical shape acquired at the low-frequency ranges reveals the ideal capacitance behavior along with the faster diffusion of electrolyte-ions into the electrode. See Vellacheri et al.

TABLE 2

Comparison of the electrochemical performance of HRG//m-WO$_3$ ASC with previously reported ASCs.

| Electrodes | Specific Capacitance (F/g) | Energy Density (Wh/kg) | Power Density (W/kg) |
| --- | --- | --- | --- |
| rGO/NiSe$_2$//AC | 114 (1 A/g) | 41 | 842 |
| AC//MnMoO$_4$ nH$_2$O | 945 (3 A/g) | 37 | 935 |
| AC//Co$_2$O$_3$@rGO | 636 (1 A/g) | 36 | 225 |
| AC//MnOOH@rGO | 116 (0.5 A/g) | 41 | 400 |
| Ni@rGO@Co$_3$S$_4$//Ni@rGO@sNi$_3$S$_2$ | 940 (1.5 A/g) | 55 | 975 |
| Ni(OH)$_2$@SiC@NiCo$_2$O$_4$//SiC@Fe$_2$O$_3$ | 712 (2 A/g) | 103 | 3500 |
| MnO$_2$/CNFs//CNFs | 294 (0.5 A/g) | 35 | 497 |
| Ni(OH)$_2$@MoSe$_2$//AC | 1175 (1 A/g) | 43 | 8181 |
| NF@MnMoO$_4$//AC | 302 (1 A/g) | 107 | 801 |
| AC//Graphene@WO$_3$ | 465 (1 A/g) | 27 | 6000 |
| CoNi-LDH//AC | 2616 (1 A/g) | 35 | 1785 |
| Na-FG-CC//C@Mn$_3$O$_4$—CC | 318 (0.5 A/g) | 110 | 1352 |
| CAC/PANI/WO$_3$ | 597 (1 A/g) | 15 | 252 |
| NF@NiMoO$_4$@C//AC | 201.3 (0.5 A/g) | 72 | 852 |
| HRG//m-WO$_3$ (this work) | 389 (0.5 A/g) | 93 | 500 |

See Mu, X.; Zhang, Y.; Wang, H.; Huang, B.; Sun, P.; Chen, T.; Zhou, J.; Xie, E.; Zhang, Z., A high energy density asymmetric supercapacitor from ultrathin manganese molybdate nanosheets. Electrochimica Acta 2016, 211, 217-224; Dighe, A. B.; Dubal, D. P.; Holze, R., Screen Printed Asymmetric Supercapacitors based on LiCoO2 and Graphene Oxide*. Z Anorg. Allg. Chem. 2014, 640 (14), 2852-2857; Xie, L.-J.; Wu, J.-F.; Chen, C.-M.; Zhang, C.-M.; Wan, L.; Wang, J.-L.; Kong, Q.-Q.; Lv, C.-X.; Li, K.-X.; Sun, G.-H., A novel asymmetric supercapacitor with an activated carbon cathode and a reduced graphene oxide-cobalt oxide nanocomposite anode. J. Power Sources 2013, 242, 148-156; Cao, J.; Wang, Y.; Zhou, Y.; Ouyang, J.-H.; Jia, D.; Guo, L., High voltage asymmetric supercapacitor based on MnO2 and graphene electrodes. J. Electroanal. Chem. 2013, 689, 201-206; Cao, Y.; Xiao, Y.; Gong, Y.; Wang, C.; Li, F., One-pot synthesis of MnOOH nanorods on graphene for asymmetric supercapacitors. Electrochimica Acta 2014, 127, 200-207; Ghosh, D.; Das, C. K., Hydrothermal growth of hierarchical Ni3S2 and Co3S4 on a reduced graphene oxide hydrogel@ Ni foam: a high-energy-density aqueous asymmetric supercapacitor. ACS applied materials & interfaces 2015, 7 (2), 1122-1131; Lin, T.-W.; Dai, C.-S.; Hung, K.-C., High energy density asymmetric supercapacitor based on NiOOH/Ni 3 S 2/3D graphene and Fe 3 O 4/graphene composite electrodes. Sci. Rep. 2014, 4, 7274; Lin, W.; Yu, W.; Hu, Z.; Ouyang, W.; Shao, X.; Li, R.; Yuan, D. S., Superior performance asymmetric supercapacitors based on flake-like Co/Al hydrotalcite and graphene. Electrochimica Acta 2014, 143, 331-339; Zhao, J.; Li, Z.; Yuan, X.; Yang, Z.; Zhang, M.; Meng, A.; Li, Q., A high-energy density asymmetric supercapacitor based on Fe2O3 nanoneedle arrays and NiCo2O4/Ni (OH) 2 hybrid nanosheet arrays grown on SiC nanowire networks as free-standing advanced electrodes. Advanced Energy Materials 2018, 8 (12), 1702787; Zhao, P.; Yao, M.; Ren, H.; Wang, N.; Komarneni, S., Nanocomposites of hierarchical ultrathin 93MnO2 nanosheets/hollow carbon nanofibers for high-performance asymmetric supercapacitors. Appl. Surf. Sci. 2019, 463, 931-938; Kirubasankar, B.; Palanisamy, P.; Arunachalam, S.; Murugadoss, V.; Angaiah, S., 2D MoSe2—Ni(OH)2 nanohybrid as an efficient electrode material with high rate capability for asymmetric supercapacitor applications. Chem. Eng. J. 2019, 355, 881-890; Shinde, P. A.; Seo, Y.; Ray, C.; Jun, S. C., Direct growth of WO3 nanostructures on multi-walled carbon nanotubes for high-performance flexible all-solid-state asymmetric supercapacitor. Electrochimica Acta 2019, 308, 231-242; Das, A. K.; Paria, S.; Maitra, A.; Halder, L.; Bera, A.; Bera, R.; Si, S. K.; De, A.; Ojha, S.; Bera, S.; Karan, S. K.; Khatua, B. B., Highly Rate Capable Nanoflower-like NiSe and WO3 @PPy Composite Electrode Materials toward High Energy Density Flexible All-Solid-State Asymmetric Supercapacitor. ACS Applied Electronic Materials 2019, 1 (6), 977-990; Nayak, A. K.; Das, A. K.; Pradhan, D., High performance solid-state asymmetric supercapacitor using green synthesized graphene—WO$_3$ nanowires nanocomposite. ACS Sustain. Chem. Eng. 2017, 5 (11), 10128-10138; Xie, L.-j.; Sun, G.-h.; Xie, L.-f.; Su, F.-y.; Li, X.-m.; Liu, Z.; Kong, Q.-q.; Lu, C.-x.; Li, K.-x.; Chen, C.-m., A high energy density asymmetric supercapacitor based on a CoNi-layered double hydroxide and activated carbon. New Carbon Materials 2016, 31 (1), 37-45, each incorporated herein by reference in their entirety.

A simple and effective approach for the preparation of highly efficient electrode-materials that can be directly assembled into high-performance supercapacitors is described. An asymmetric supercapacitor was assembled, containing or consisting of the m-WO$_3$ and HRG, acting as negative-electrode and positive-electrode, respectively. The fabricated HRG//m-WO$_3$ ASC showed superior electrochemical supercapacitor performance within a large OPW range of 0.0 to 1.6 V and demonstrated a maximum specific capacitance of 389 F/g at 0.5 A/g. A higher energy density of 93 Wh/kg was achieved at a power density of 500 W/kg which remained at 44 Wh/kg with power density of 5000

W/kg. Moreover, the ASC showed outstanding cycling-stability by keeping ~92% of its original $C_{sp}$ value even after 5000 GCD cycles. It has been demonstrated that the as-synthesized m-WO$_3$ and HRG based electrodes could provide an efficient platform in the fabrication of high-performance ASC for efficient energy storage devices. The main findings indicate that the prepared HRG and m-WO$_3$ materials are stable enough to use as effective electrodes in the fabrication of supercapacitors for the growing requirements on the high-performance and low-cost future generation efficient energy storage devices.

Obviously, numerous modifications and variations of the present disclosure are possible in light of the above teachings. It is therefore to be understood that within the scope of the appended claims, the invention may be practiced otherwise than as specifically described herein.

The invention claimed is:

1. An energy storage device, comprising:
a plurality of electric charge supercapacitors connected in parallel;
wherein each of the electric charge supercapacitors is an asymmetric nanocomposite supercapacitor, comprising:
a first electrode;
a second electrode;
a porous separator between the first and second electrodes;
   wherein the porous separator is coated with an electrolyte and is at least one selected from the group consisting of a polypropylene membrane and a glass fiber membrane;
wherein the first electrode comprises:
   a first substrate at least partially coated on one face with a first mixture of a first binding compound and at least one carbonaceous material selected from the group consisting of graphite, graphene, activated carbon, reduced graphene oxide, and highly reduced graphene oxide (HRG);
wherein the second electrode comprises:
   a second substrate at least partially coated on one face with a second mixture of a second binding compound and monoclinic tungsten-oxide (m-WO$_3$) nanoplates;
   wherein the face of the first substrate and the face of the second substrate coated with the carbonaceous material and m-WO$_3$ nanoplates, respectively, are separated by and in direct contact with the porous separator; and
   wherein the first and second substrates are formed from at least one material selected from the group consisting of copper, nickel, and steel.

2. The energy storage device of claim 1, wherein:
the electrolyte is at least one selected from a group consisting of a hydrogen halide, sulfuric acid, nitric acid, perchloric acid, chloric acid, an alkali metal salt, and an alkaline earth salt; and
the binding compound is at least one selected from a group consisting of polyvinylidene fluoride and n-methylpyrrolidone.

3. The energy storage device of claim 1, wherein:
the first mixture comprises 10-20 wt % of the first binding compound and 80-90 wt % of the carbonaceous material based on the total weight of the first binding compound, and the carbonaceous material; and
the second mixture comprises 10-20 wt % of the second binding compound and 80-90 wt % of the m-WO$_3$ nanoplates based on the total weight of the binding compound, and the m-WO$_3$ nanoplates.

4. The energy storage device of claim 1, wherein:
the carbonaceous material is HRG;
the HRG is substantially crystalline and in layered sheet form having 2-20 layers;
the sheets have an average d-spacing of 0.25-0.45 nm;
the HRG comprises at most 5% oxygen based on the total atomic weights of carbon, hydrogen, and oxygen in the HRG.

5. The energy storage device of claim 1, wherein:
the m-WO$_3$ nanoplates are substantially monoclinic crystalline phase;
the platelets have an average d-spacing of 0.3-0.5 nm;
the platelets have an average length of 50-200 nm, an average width of 10-150 nm, and an average thickness of 5-20 nm; and
wherein the O and W elements are homogeneously distributed throughout the nanoplates.

6. The energy storage device of claim 1, wherein:
the carbonaceous material is HRG;
the HRG has a surface area of 500-800 m$^2$/g; and
the m-WO$_3$ nanoplates have a surface area of 150-250 m$^2$/g.

7. The energy storage device of claim 1, wherein:
the thickness of the coating of the carbonaceous material on the first substrate and the m-WO$_3$ nanoplates on the second substrate is less than 500 nm each.

8. The energy storage device of claim 1, wherein:
the first electrode has a specific capacitance of at least 440 F/g at a current density of 0.5 A/g.

9. The energy storage device of claim 1, wherein:
the second electrode has a specific capacitance of at least 310 F/g at a current density of 0.5 A/g.

10. The energy storage device of claim 1, having:
a specific capacitance of at least 380 F/g at a current density of 0.5 A/g;
wherein the carbonaceous material is HRG.

11. The energy storage device of claim 10, wherein:
at least 90% of the initial specific capacitance is maintained after 5000 charge-discharge cycles.

12. The energy storage device of claim 10, having:
an energy density of at least 90 Wh/kg at a power density of 500 W/kg.

13. The energy storage device of claim 1, wherein:
the supercapacitor is operated up to 1.8 V.

14. A wearable device comprising the energy storage device of claim 1, wherein:
the energy storage device is electrically connected to a sensor; and
the energy storage device functions as a battery.

15. The energy storage device of claim 1, comprising:
2-10 of the asymmetric nanocomposite supercapacitors.

* * * * *